United States Patent
Backor et al.

(10) Patent No.: US 12,356,045 B2
(45) Date of Patent: Jul. 8, 2025

(54) VIDEO STREAM INTERFACE BASED ON THIRD-PARTY WEBPAGE INFORMATION

(71) Applicant: Loop Now Technologies, Inc., San Mateo, CA (US)

(72) Inventors: Stefan Backor, Zilina (SK); Ziming Zhuang, Palo Alto, CA (US); Jerry Ting Kwan Luk, Menlo Park, CA (US); Wu-Hsi Li, Somerville, MA (US)

(73) Assignee: Loop Now Technologies, Inc., San Mateo, CA (US)

( * ) Notice: Subject to any disclaimer, the term of this patent is extended or adjusted under 35 U.S.C. 154(b) by 0 days.

(21) Appl. No.: 17/873,226

(22) Filed: Jul. 26, 2022

(65) Prior Publication Data

US 2023/0032373 A1 Feb. 2, 2023

Related U.S. Application Data

(60) Provisional application No. 63/388,270, filed on Jul. 12, 2022, provisional application No. 63/351,840, (Continued)

(51) Int. Cl.
*H04N 21/478* (2011.01)
*H04N 21/43* (2011.01)
(Continued)

(52) U.S. Cl.
CPC . *H04N 21/47815* (2013.01); *H04N 21/43074* (2020.08); *H04N 21/4316* (2013.01); *H04N 21/4722* (2013.01)

(58) Field of Classification Search
CPC ....... H04N 21/47815; H04N 21/43074; H04N 21/4316; H04N 21/4722; G06Q 30/0601
See application file for complete search history.

(56) References Cited

U.S. PATENT DOCUMENTS 8,069,414 B2  11/2011  Hartwig et al.
8,244,707 B2   8/2012  Lin et al.
(Continued)

FOREIGN PATENT DOCUMENTS

KR  10-2015-0122039 A  10/2015
KR     101606860 B1     3/2016

OTHER PUBLICATIONS

International Search Report dated Nov. 17, 2022 for PCT/US2022/038269.

*Primary Examiner* — Nathan J Flynn
*Assistant Examiner* — Christine A Kurien
(74) *Attorney, Agent, or Firm* — Adams Intellex, PLC

(57) ABSTRACT

Techniques for display using a video stream interface based on third-party webpage information are disclosed. Information on one or more products is obtained from a website by a third party. The one or more products comprise a product, a service, a coupon, or a membership. A video about the one or more products is rendered by a video user interface to a user. The video user interface comprises a video player in combination with a user interface. The video user interface and the third party are interfaced between each other based on a user interaction with the video user interface. Product information is fetched from a server based on the interfacing between the video user interface and the third party. Further product information comprises a reaction, a chat, a transaction, a promotion, and an interaction. The video is augmented with further information based on the fetching.

29 Claims, 12 Drawing Sheets

Related U.S. Application Data filed on Jun. 14, 2022, provisional application No. 63/350,894, filed on Jun. 10, 2022, provisional application No. 63/344,064, filed on May 20, 2022, provisional application No. 63/332,703, filed on Apr. 20, 2022, provisional application No. 63/302,593, filed on Jan. 25, 2022, provisional application No. 63/226,081, filed on Jul. 27, 2021.

(51) Int. Cl.
*H04N 21/431* (2011.01)
*H04N 21/4722* (2011.01)

(56) References Cited

U.S. PATENT DOCUMENTS

| | | | |
|---|---|---|---|
| 8,572,490 B2 | 10/2013 | Hartwig et al. | |
| 9,118,712 B2 | 8/2015 | McCoy et al. | |
| 9,152,392 B2 | 10/2015 | Petro et al. | |
| 9,532,116 B2 | 12/2016 | Terpe | |
| 9,608,983 B2 | 3/2017 | Fee | |
| 9,645,700 B2 | 5/2017 | Tsai | |
| 9,693,013 B2 | 6/2017 | Nesamoney et al. | |
| 9,824,372 B1 | 11/2017 | Seth et al. | |
| 10,089,402 B1 | 10/2018 | Winkler et al. | |
| 10,496,350 B2 | 12/2019 | Lazier et al. | |
| 10,955,999 B2 | 3/2021 | Lotinsky et al. | |
| 11,317,060 B1 | 4/2022 | Libin | |
| 2007/0043713 A1 | 2/2007 | Elmi et al. | |
| 2010/0149359 A1 | 6/2010 | Taoka | |
| 2013/0021373 A1 | 1/2013 | Vaught et al. | |
| 2013/0097477 A1 | 4/2013 | Adolf et al. | |
| 2013/0145267 A1 | 6/2013 | Ramachandran | |
| 2013/0215116 A1* | 8/2013 | Siddique | G06Q 20/40 705/26.7 |
| 2013/0275411 A1* | 10/2013 | Kim | G06F 16/532 707/722 |
| 2013/0276021 A1 | 10/2013 | Cho | |
| 2014/0101537 A1 | 4/2014 | Antkowiak et al. | |
| 2014/0106881 A1 | 4/2014 | Antkowiak et al. | |
| 2014/0229331 A1* | 8/2014 | McIntosh | G06Q 30/0613 705/26.41 |
| 2014/0376876 A1* | 12/2014 | Bentley | G06V 40/23 386/227 |
| 2015/0177940 A1 | 6/2015 | Trevino et al. | |
| 2015/0195175 A1 | 7/2015 | Kariman | |
| 2015/0213516 A1 | 7/2015 | Jeremias | |
| 2015/0278348 A1* | 10/2015 | Paruchuri | G06F 16/9535 707/771 |
| 2016/0065929 A1 | 3/2016 | Barcons-Palau et al. | |
| 2016/0088369 A1 | 3/2016 | Terpe | |
| 2016/0093105 A1 | 3/2016 | Rimon et al. | |
| 2016/0142490 A1* | 5/2016 | Cho | H04N 21/4725 709/217 |
| 2017/0109584 A1* | 4/2017 | Yao | H04N 21/4666 |
| 2017/0269816 A1 | 9/2017 | Bradley et al. | |
| 2018/0068019 A1 | 3/2018 | Novikoff et al. | |
| 2018/0132011 A1* | 5/2018 | Shichman | G11B 27/031 |
| 2018/0253765 A1 | 9/2018 | Avedissian et al. | |
| 2018/0288396 A1 | 10/2018 | Bouazizi et al. | |
| 2018/0336600 A1* | 11/2018 | Elango | G06Q 30/0277 |
| 2020/0005387 A1* | 1/2020 | Rav-Acha | G06Q 30/0627 |
| 2021/0014559 A1* | 1/2021 | Thapaliya | H04N 21/4316 |
| 2022/0053233 A1 | 2/2022 | Baxter et al. | |
| 2022/0122161 A1 | 4/2022 | Perera | |
| 2022/0191594 A1 | 6/2022 | Devoy, III et al. | |
| 2022/0345755 A1 | 10/2022 | Pollock et al. | |
| 2022/0353473 A1 | 11/2022 | Springer | |
| 2023/0126108 A1 | 4/2023 | Roper | |

\* cited by examiner

VIDEO STREAM INTERFACE BASED ON THIRD-PARTY WEBPAGE INFORMATION

RELATED APPLICATIONS

This application claims the benefit of U.S. provisional patent applications "Video Stream Interface Based On Third-Party Webpage Information" Ser. No. 63/226,081, filed Jul. 27, 2021, "Ecommerce Purchase Within A Short-Form Video Environment" Ser. No. 63/302,593, filed Jan. 25, 2022, "Tokenizing A Manipulated Short-Form Video" Ser. No. 63/332,703, filed Apr. 20, 2022, "Short-Form Videos Usage Within A Frame Widget Retail Environment" Ser. No. 63/344,064, filed May 20, 2022, "Manipulating Video Livestream Background Images" Ser. No. 63/350,894, filed Jun. 10, 2022, "Product Card Ecommerce Purchase Within Short-Form Videos" Ser. No. 63/351,840, filed Jun. 14, 2022, and "Search Using Generative Model Synthesized Images" Ser. No. 63/388,270, filed Jul. 12, 2022.

Each of the foregoing applications is hereby incorporated by reference in its entirety.

FIELD OF ART

This application relates generally to display and more particularly to video stream interface based on third-party webpage information.

BACKGROUND

Video streaming has become a wildly popular technique by which tastemakers, social media influencers, celebrities, politicians, advertisers, and others, including "just plain folks" who have any kind of opinion, let their internet viewers and followers know what they think, believe, recommend, endorse, berate, harangue, or have for sale. Loyal followers, subscribers, fans, and the generally curious can easily spend many hours viewing video streams provided by their favorite and recently discovered hosts. Seemingly countless further hours can be spent searching for similar streams, streams to support a strongly held opinion, or streams to refute views unsupported or unbelieved by an individual. In part, video streaming, which refers to recording and sending or "broadcasting" video simultaneously, has become so immensely popular because it can be passably accomplished with relatively simple and inexpensive equipment. A person interested in providing a video stream can get on the Internet or a cellular network with a computer, tablet, or smartphone; a simple video camera; and a modest microphone. No studio or editing tools are necessary. Mobile journalism or "MoJo" is one example. At the other end of the video streaming spectrum, professionally produced streams can include animations, computer-generated images, and slick graphics; presentations or performances by well-known celebrities and actors; and many other features. These latter streams are often produced by international corporations, governments, and others who want to make big impressions with their streams.

Some of the video streams can be watched in real time as the streams are being produced, rather than having to download the entire video prior to being able to view it. Such livestream videos are particularly popular among video viewers. As the interest in and the popularity of the video stream increases, the video stream host can improve equipment and use more sophisticated production tools, among other enhancements. The most popular video streams cover a wide variety of media, interests, and affinity groups, among many others. Social media streaming in particular is very popular, allowing users to easily start and share a video stream. The streams can include children's books readings with arts and crafts projects, social events, or street protests. Other popular video streams include sporting events, e-gaming and video games, and political rallies. An individual looking for information, entertainment, or support has ostensibly limitless video streams from which to choose.

SUMMARY

Electronic devices can be used to access information of many types on the Internet. The electronic devices, which can include desktop computers, laptop computers, and personal electronic devices such as tablets, smartphones, and PDAs, are widely used by people who want to observe and interact with content such as product information. The product information can be presented in the form of a video stream. The video streams can include livestreams in which an individual or team of individuals can present thoughts and comments, hawk goods and services, and so on. The video streams can be used to promote an individual, a good, or a service, etc.; to present information such as news, sports, government announcements, entertainment, or educational material; and so on. A video stream can be viewed on any of a wide range of electronic devices. The video stream can be viewed in a window associated with a video app or player, by using a plugin associated with a web browser window, etc. An originator of a video stream, such as an influencer or other individual, can include in their stream one or more products that have come, whether favorably or unfavorably, to the attention of the originator. A viewer can click on a product within the video in order to obtain further information about a product, a good, a service, etc. The further information can include access to a website associated with the individual, details about a good or service that is the subject of the video stream, etc. The further information can be accessed by selecting a product in the video stream. The results of the selecting the product can include detailed information, web content, etc. The web content can include text, photographs or images, audio, videos, etc. The further information can be rendered along with the video. In order for the product, the other information, and the video to fit within the size of the app or browser window, the product information can be rendered in a window or frame that appears above or "on top" of the original content. The rendering can be accomplished using a frame for the original video and a child frame for product information.

Display is accomplished using a video stream interface based on third-party webpage information. The third-party information can include product information, where the product information can include text, video, and audio content. Information on one or more products can be obtained from a website by a third party for display. The display enables a video stream interface based on third-party webpage information. The information on the one or more products can include a video stream. The video stream can be provided by an individual, a team, a stream provider, and so on. The video stream can include a livestream video. The video stream is displayed using a video player executing on a device. The video stream can be displayed within a frame or a window associated with the video player. The displaying the video can be accomplished using an app, a window associated with a web browser, and the like. The content that is displayed can include text, images, audio, videos, etc. An interface between the video user interface and the third party captures user interaction with the video interface. User interaction can include clicking, tapping, or otherwise selecting a product about which further information is desired. Product information is fetched from a server, based on the interfacing between the video user interface and the third party. The video is augmented with further information based on the fetching. The further information can be rendered on top of the third-party webpage information. The further information can be displayed within a child frame associated with the video player. The video can be reduced to render the video as a reduced video on a portion of the device display. The reduced video can be rendered and superimposed over the webpage information. The rendering the video along with a webpage from the website is accomplished without a popup window.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
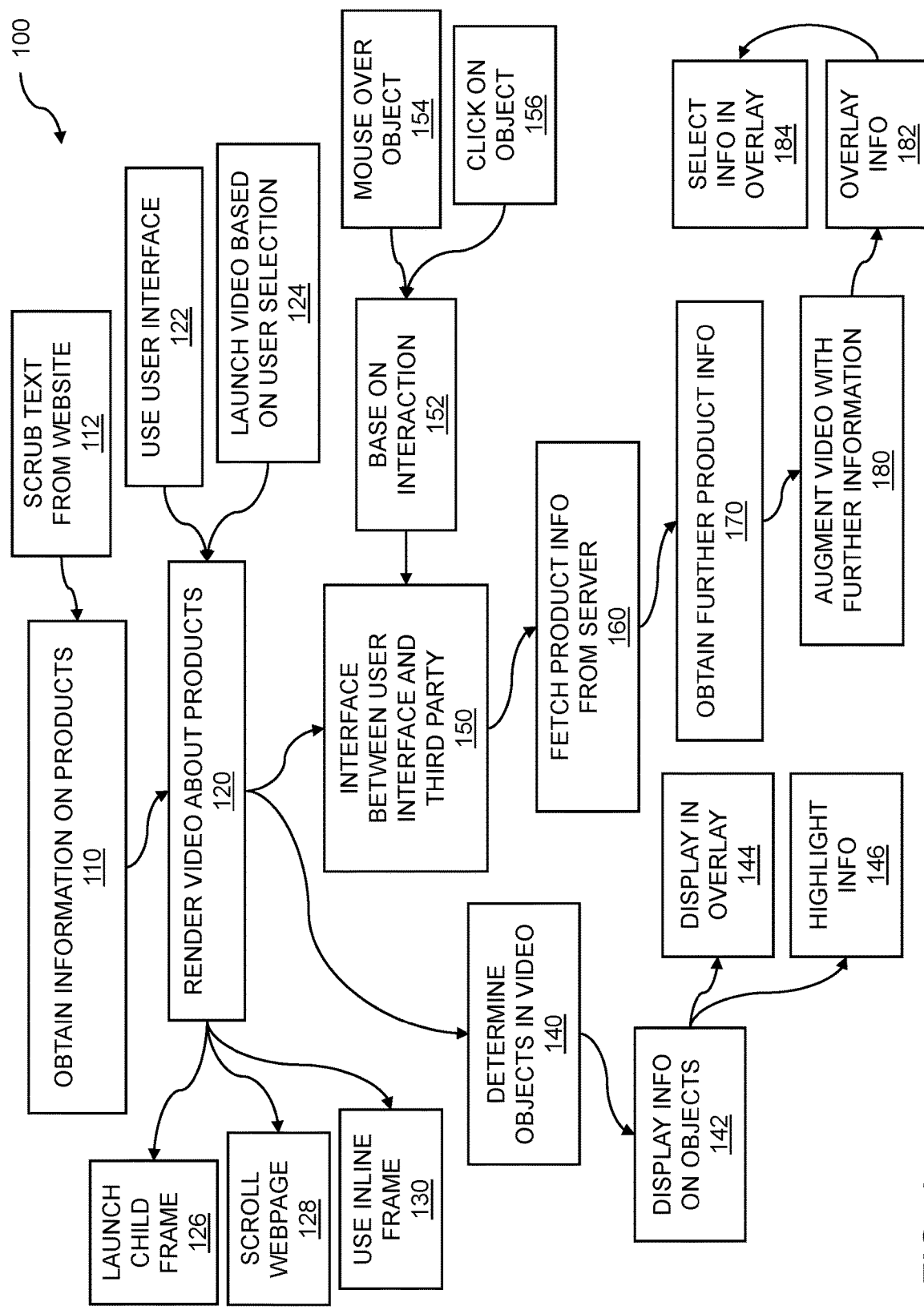
FIG. 1 is a flow diagram for a video stream interface based on third-party webpage information.

Techniques for display based on a video stream interface are disclosed. The video stream interface is based on third-party webpage information. The third-party webpage information can be displayed within a frame and a child frame. A video, such as a video stream video, a livestream video, a short-form video, etc., can be received by an individual. The received video stream can be received and viewed using an electronic device such as a desktop computer, a laptop computer, a tablet, a smartphone, a personal digital assistant (PDA), and so on. The video stream video can be viewed using an app such as a video player, a web browser with a video plugin, and so on which can be loaded on an electronic device. The video stream enables the individual to reach out to their subscribers, followers, fans, like-minded individuals, the curious, and others. The video stream can present a message such as an opinion, an announcement, a product promotion or criticism, etc. When products are included in the video stream, a video about the products can be rendered to a user by a user interface. Information about the products can be obtained from a third-party webpage, where the webpage can offer the products for sale. The products within the video stream can be selectable. The selection of one or more products can be accomplished by tapping or clicking a "shop icon" such as a bag or cart, selecting products within a video stream video, and so on. By selecting the product, a viewer is able to obtain product details such as size, color, style, availability, configuration details, shipping and handling costs, and the like. The viewer can choose a particular version of the product, a size and color, etc., and can purchase the product. The providing of the information about the product and the purchasing of the product are accomplished by providing an interface between the video user interface and the third party. The video stream can also include a chat feature in which viewers can share comments, endorsement, rants, web links, and much more. The video stream video and the information obtained by the third-party website can be rendered within a video app or browser window using a frame for the video and a child frame for product information. The product information can be reduced in size and can be rendered over the video stream video.

Display is enabled using a video stream interface based on third-party webpage information. Information is obtained on one or more products from a website by a third party. The third-party website can include an information source, a search engine, an online retailer, and so on. A video about the one or more products is rendered by a video user interface to a user. The video user interface can include a video app, a window associated with a web browser, and the like. The video user interface can be executed on a range of electronic devices such as smartphones, PDAs, tablets, and computers. The user can select a product about which she or he desires further information. The video user interface and the third-party website are interfaced between each other based on a user interaction with the video user interface. The interfacing can be accomplished using a callback function such as a JavaScript™ callback function. Product information is fetched from a server based on the interfacing between the video user interface and the third party. The product information can include information such as size, color, style, fit, and so on. The product information can include configuration options, shipping rates, etc. The video is augmented with further information based on the fetching. The augmenting can include opening a window or a frame, where the window or the frame can appear to be superimposed "on top" of the video stream in which the product appeared. The augmenting enables the user to further view the product, to select the particular product of interest, to configure the product, and so on. The user can then purchase the product. The purchasing of the product is enabled through the video stream interface and executed on the third-party webpage.

A video stream in which a product is featured can include a livestream, a video stream, a short-form video, and so on. In the case of a livestream video, the video can be provided by an individual who desires to speak about a product, share an opinion about the product, comment on a news story associated with the product, and so on. The video stream which includes the product is displayed in a window or frame on a device display. The window or frame can be associated with an app such as a video app or web browser. The product rendered within the video can be selectable. Selection of the product can be accomplished by familiar device interactions such as swiping, tapping, or clicking. The selection of the product enables fetching of product information from a server. The product information can be fetched from a third-party webpage. The product information that is fetched can be based on the type of product such as clothing, cosmetics, computing hardware, fishing tackle, etc. The product information that is fetched can be rendered within a window or child frame. The product information can be rendered "on top" of the video which contained the product. The product information can be reduced in size prior to rendering on a portion of the device display. The product information can be rendered within a video such as a reduced video. The reduced video can be rendered on top of the video. The reduced video can be rendered initially at a position within the window and can be moved to another position based on an action taken by the user. In embodiments, the rendering the video along with a webpage from the website is accomplished without a popup window.

FIG. 1 is a flow diagram for a video stream interface based on third-party webpage information. Videos, which can include livestream videos, video streams, short-form videos, and so on, can include various media and content types. While some videos can include news videos, entertainment videos, political message videos, and so on, video stream videos can include live or recorded videos provided by individuals, teams of collaborators, and the like. The livestream videos can be provided by social media influencers, tastemakers, celebrities, and others. Anyone with access to minimal equipment such as a camera, a microphone, and an electronic device, and who has something to say, can provide a video stream to inform, entertain, or inspire others, or just themselves. The videos can be viewed on an electronic device used by an individual. The viewing can be accomplished by rendering the video within a frame associated with a window. The window can include a window provided by an app, a window associated with a web browser, etc. The video can include one or more products, where the products can be available on a third-party website. Information associated with the products can include links to other webpages associated with a website; other websites; content such as text, images, audio, video; and so on. The information can be fetched from a server, such as a server associated with the website, based on a user interacting with a video that she or he is watching. The user interaction can include selection of a product by the user. The information that is fetched can be used to augment a video, where the video can include a video about the one or more products. The augmented video can be rendered in a window or frame associated with the video user interface. Content that results from selecting the link can be rendered in a child frame associated with the viewing window. The user can continue to view the video and can interact with the contents rendered in a frame such as a child frame. The video can be paused and restarted, while the contents in the child frame can be scrolled, clicked, etc. The contents within the child frame can be scrollable in the horizontal orientation, in the vertical orientation, etc.

The flow 100 includes obtaining information 110 on one or more products from a website by a third party. The products can include a range of goods and services. In embodiments, the one or more products can include a product, a service, a coupon, or a membership. The information can include a description of a product; available options for the product such as size, color, and fit; availability of the product; shipping and handling charges associated with the product; and so on. In a usage example, a user is interested in a laptop she has seen. The information associated with the laptop that can be obtained can include processor speed, memory capacity, storage capacity, case color, availability, the configured price, free shipping, and proposed delivery data if ordered now. The third-party website from which the information can be obtained can include a manufacturer site, an e-commerce site, a local reseller site, etc. Further embodiments can include obtaining information associated with the one or more products. The further information can include information about similar products, a comparison of the product to similar products, reviews, and so on. In embodiments, the information associated with the one or more products can include a reaction, a chat, a transaction, a promotion, an interaction, etc. The information can be obtained using a variety of techniques. In the flow 100, the obtaining information is accomplished by scrubbing 112 text from the third-party website. The "scrubbing" can be accomplished by obtaining information provided by the website owner or administrator, obtaining a snapshot of the website, etc. In embodiments, the scrubbing can include obtaining links embedded in the text, determining links to other information, and the like.

The flow 100 includes rendering 120 a video about the one or more products. The video can include a video stream, a short-form video, and so on. The video can include multimedia content such as audio and video, a soundtrack, a slideshow, and so on. In embodiments, the video can include a livestream. In the flow 100, the video is rendered by a video user interface 122. The rendered video is provided to a user. The video user interface can be based on an app such as a video player, an app developed to render a video about one or more products, a plugin associated with a web browser, etc. The video player can be based on a general-purpose video app such as QuickTime™, VLC Media Player™, GOM Player™, and so on. In embodiments, the video user interface comprises a video player in combination with a user interface. The video user interface can be downloaded from an app store such as the Apple™ App Store™, Google™ Play App Store™, and so on. The user interface can be enabled by downloading and installing an extension to a browser such as Chrome™, DuckDuckGo™ Edge™, Firefox™, Lycos™, Opera™, Safari™, Tor™, and the like. The flow 100 further includes launching the video 124 based on a selection by the user of a link on the website. A user can select a link on a website where the link can be associated with video about a product. The selecting of the link by the user can be accomplished by moving a cursor, clicking, tapping, etc.

The rendering the video can be accompanied by presenting other data such as text or audio files, a slide show, and so on. The video can be rendered along with a webpage. In embodiments, the rendering the video along with a webpage from the third-party or other website can be accomplished without a popup window. By avoiding use of popup windows, a user can obtain information without the annoyance of the popup windows blocking views to parts or the entirety of a screen associated with a device on which the video user interface is operating. No changes to popup blocker settings are required simply to view the rendered video. The flow 100 further includes launching a child frame 126 into which the webpage is displayed. The child frame can be associated with a frame or "parent frame". The child frame can be smaller than the parent frame. The smaller child frame can enable a picture-in-picture rendering of a video, a webpage, etc. In embodiments, the webpage can be an outer picture for the picture-within-picture function. The webpage, the video, and other web data can be rendered in the smaller frame, the larger frame, in more than one child frame, etc. In embodiments, the rendering the video can be an inner picture for the picture-within-picture function. The child frame can surround the video being rendered. The child frame surrounding the frame in which the video is being rendered can be used to provide webpage information, photos, additional video, etc. The video can be rendered at any position within the video user interface. In embodiments, the video is rendered in a lower right corner of a window containing the webpage. The lower right corner can be a default location, a configurable location, a user defined location, and so on. The flow 100 further includes scrolling the webpage 128 while location of the video remains fixed. The user can scroll the webpage, click links on the webpage, etc. The scrolling can include scrolling up and down, scrolling left and right, and so on. In the flow 100, the rendering can be accomplished using an inline frame function 130 within an internet browser application. The contents of the frame can be updated, changed, reloaded, etc., without affecting the internet browser application.

The flow 100 further includes determining a plurality of objects 140 within the video. The objects within the video can include items being used by a person within the video, items worn by the person, items presented by the person, and so on. In a usage example, the determining a plurality of objects can include brand and color of clothing, accessories worn, devices used, items in an everyday carry, and the like. The plurality of objects can further include products being used by the person, promoted, or berated by the person, and so on. The flow 100 further includes displaying information 142 on each of the plurality of objects within the video. A variety of techniques can be used to display the information on the objects. The information can be displayed by clicking on the object, hovering a cursor over the object, etc. In the flow 100, the displaying can include displaying information as an overlay 144 on the video. The overlay can include displaying the information in a shape such as a square, a circle, and so on. An opacity can be associated with the overlay so that the information does not completely obscure the object for which the information is being displayed. Further embodiments can include selection by a user of information in the overlaying for an object within the plurality of objects. The selection can be accomplished by mousing, tapping, clicking, etc. In the flow 100, the displaying can include highlighting information 146 on a webpage for an object, based on a user interaction. The highlighting can be accomplished using techniques such as bolding text, underlining text, adding color, etc.

The flow 100 includes interfacing between the video user interface 150 and the third party. In order for information provided by the third party, such as information scrubbed from a website by the third party, to be presented to the user by the video user interface, an interface can be used to obtain the information, to render the information on the device, and so on. The interfacing can be accomplished using function calls, an application programming interface (API), and so on. In the flow 100, the interfacing can be based on a user interaction 152 with the video user interface. User interaction can include techniques used to manipulate computing devices, personal electronic devices, and the like. In the flow 100, the user interaction can be accomplished by mousing over 154 an object in the video. The mousing can be accomplished by moving a mouse device, by sliding across a touchpad, by swiping a digit such as a finger across a touchscreen, etc. In the flow 100, the user interaction can be accomplished by clicking 156 on an object in the video. The clicking can be accomplished by clicking a button associated with a mouse device, tapping or pressing a trackpad, tapping a touchscreen, and the like. The interfacing between the video user interface and the third party can include other operations, functions, etc. In embodiments, the interfacing can include a request for product information and for further information on an object based on the user interaction. Discussed above and throughout, the information can include details about a product, availability of a product (e.g., in stock or out of stock), etc. In further embodiments, the interfacing can include a purchase selection for an object. The purchase selection can be accomplished by clicking, tapping, etc., a shop icon such as a shopping bag or a shopping cart. Discussed in detail below, the interfacing can include passing a callback function from the video user interface to the third party based on the user interaction. The callback function can obtain information, add a product to a shopping cart associated with the third party, and so on. The callback function can be updated based on what objects such as products are visible within the video at a given time.

The flow 100 includes fetching product information 160 from a server based on the interfacing between the video user interface and the third party. The fetching product information can include product details such as manufacturer, date of introduction, dimensions, cost, availability, delivery targets, and so on. The server can be associated with a manufacturer, an e-commerce site, etc. The server can include a social media server. The fetching information can be based on a user selection of one or more products. The fetching information can be initiated by a user interaction with the video user interface such as selecting a product by mousing, clicking, or tapping; placing a product in a shopping bag or shopping cart; and the like. In the flow 100, the interfacing comprises a request for further information 170 on an object based on the user interaction. The further information can include additional product details, verified purchaser reviews, social media comments, etc. The flow 100 includes augmenting the video 180 with further information based on the fetching. The augmenting the video can include updating the video based on what products are visible at a given time, providing the additional product information, enhancing the video with product reviews, and so on. In the flow 100, the augmenting can include overlaying 182 information over a portion of the video. The information can be overlaid by including the information in a box, a circle, or some other shape. The overlaying information can appear over an object; can appear over an object when the object is moused over, clicked, tapped; etc. The portion of the video can include a region of the video such as the lower right corner of the video. The flow 100 further includes selection 184 by a user of information in the overlaying for an object within the plurality of objects. The selection can be accomplished by mousing or swiping over the object, clicking or tapping the object, and so on.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
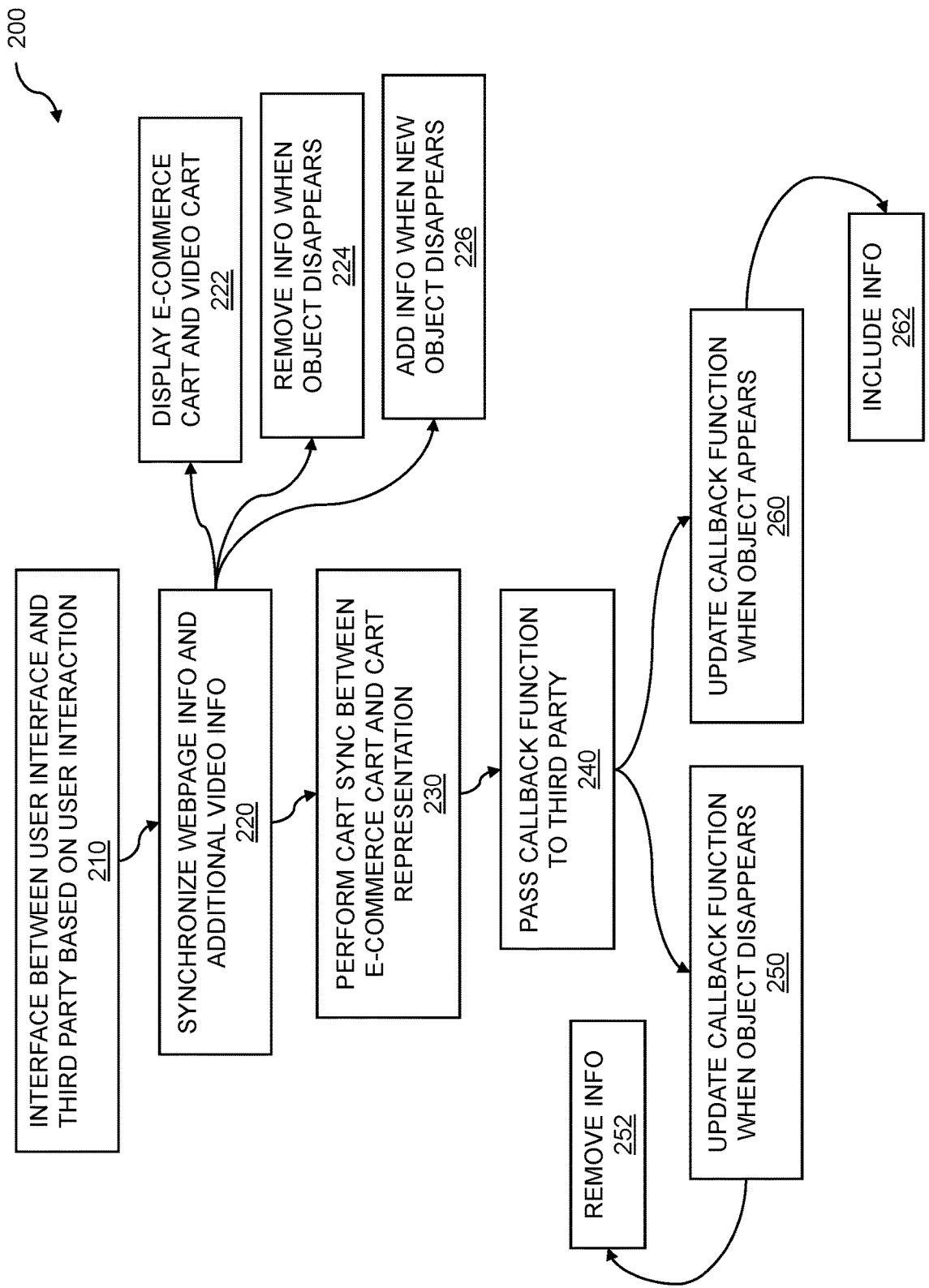
FIG. 2 is a flow diagram for cart rendering.

FIG. 2 is a flow diagram for cart rendering. Discussed above and throughout, a video can be rendered by a video user interface to a user. The video can include a livestream video, a video stream, a short-form video, and so on. The video can contain objects such as products that are being presented, discussed, offered for sale, and so on. The user to whom the video is rendered can interact with the video by selecting objects within the video. Selecting the objects can be used to fetch and provide information about the objects, to purchase the objects, etc. In embodiments, the selecting of an object can be accomplished by clicking, tapping, etc., a "shop" icon. The shop icon can be represented by a shopping bag, a shopping cart, a shopping basket, and so on. The shopping cart is enabled by the video stream interface based on third-party webpage information. Information is obtained on one or more products from a website by a third party. A video about the one or more products is rendered by a video user interface to a user. Product information is fetched from a server based on the interfacing between the video user interface and the third party. The video is augmented with further information based on the fetching.

The flow 200 includes interfacing 210 between the video user interface and the third party based on a user interaction with the video user interface. The user interaction with the video user interface can include computing device interactions, smart device interactions, touch screen gestures, and so on. In embodiments, the user interaction can be accomplished by mousing over an object in the video. The mousing over can be accomplished by moving a cursor by means of a mouse device or a trackpad, by swiping over the object with a digit in contact with a touch screen, and the like. In other embodiments, the user interaction can be accomplished by clicking on an object in the video. The clicking can be accomplished by clicking a button associated with a mouse device, tapping a trackpad, tapping a touchscreen, etc. Further embodiments include rendering a webpage based on the user interaction. The webpage can include a product webpage, a webpage that includes a video about the webpage, and so on.

The flow 200 includes synchronizing 220 information on the webpage with additional information shown on the video. The video can show a single object such as a single product or service, can compare products or services, can include a plurality of goods or services, and so on. The synchronizing can be based on a user interaction. In a usage example, a user interacts with the video user interface by selecting a product. The synchronizing can include jumping to a portion of the webpage that presents information on the product, zooming in on the product, and the like. In the flow 200, the synchronizing can include displaying e-commerce shopping cart information 222 on the webpage and video shopping cart information shown on the video. The shop icon, such as a shopping bag or shopping cart that can appear within the video rendered in the video user interface, can be used to access an e-commerce shopping cart. By clicking on the cart icon in the video user interface, the user can view the contents of the e-commerce cart. Mentioned above and throughout, a plurality of objects such as products can be included in website content. Since the number of objects can easily exceed the number of objects that can reasonably be displayed via the video user interface at a given time, the user can scroll through a list of objects such as products, swipe through pages of objects, and so on. As a result, objects can appear and disappear within a particular view of the objects. In the flow 200, the synchronizing can include removing information 224 on an object when the object disappears from view on the video. The object that has disappeared from view cannot be selected within the current view, so information associated with the object no longer visible can be removed. Other objects can come into view while the initial objects disappear from view 226. In the flow 200, the synchronizing can include adding information on a new object in the associated webpage when the new object appears in the video. The new object can be selected by tapping the object, adding the object to a cart, and so on. Selecting the new object can enable fetching of information associated with the new object that has come into view.

The flow 200 further includes performing cart synchronization 230 between an e-commerce shopping cart on the webpage and a cart representation displayed over a portion of the video. The shop icon in the video user interface can represent a generic shopping cart that can be coupled temporarily to an e-commerce shopping cart associated with website content rendered in the video user interface. Thus, when a user selects a product by tapping or clicking the shop icon within the video user interface, the product of interest can be added to the shopping cart on the e-commerce site. The addition of the product of interest to the e-commerce shopping cart can be accomplished by the synchronizing. The flow 200 includes passing a callback function 240 from the video user interface to the third party based on the user interaction. A callback function can include a function that is accessible to a second function. The callback function can be provided as an argument to the second function. The callback function can be executed following completion of the function to which the callback function is provided. The callback function can include a JavaScript™ callback function. In embodiments, the callback function can be updated. The flow 200 includes updating the callback function when an object disappears 250 from view on the video. The user can no longer interact with an object that has disappeared from view, so information associated with the object, references to the object, and so on, are no longer needed. The callback function can be updated accordingly. In the flow 200, the augmenting includes updates to remove 252 information on the object that disappears. The augmenting includes augmenting the video about the one or more products that are rendered by the video user interface to the user. The flow 200 further includes updating the callback function when an object appears 260 in view on the video. Information associated with each object that comes into view is obtained and provided to the user. The callback function can be updated to reflect the objects that have come into view. In the flow 200, the augmenting includes adding information on the object that appears 262 in view. The information can be fetched from a server that can provide information on the one or more objects that have appeared in view.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
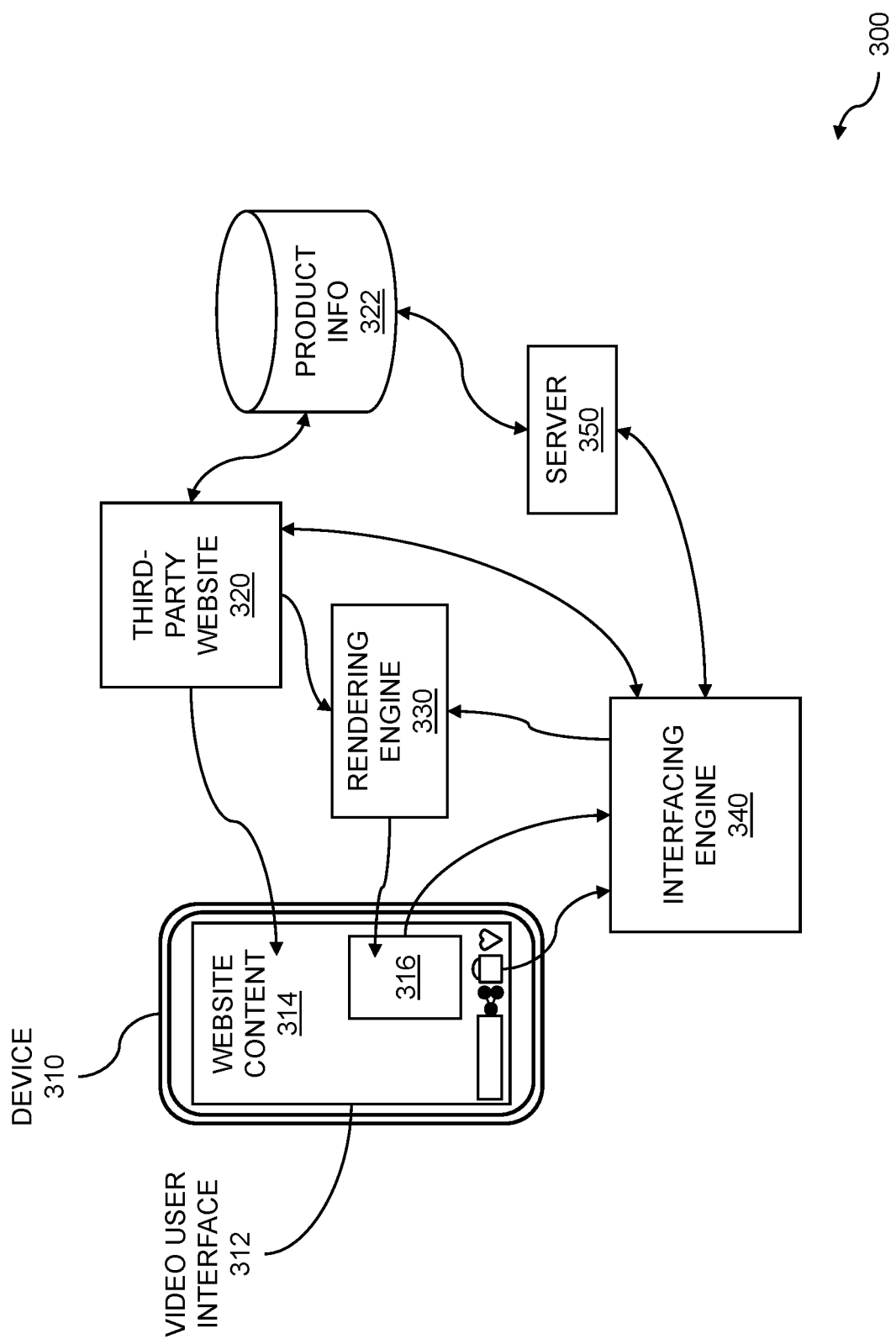
FIG. 3 shows a system block diagram for a video stream interface.

FIG. 3 shows a system block diagram for a video stream interface. A video stream interface can be used to present a video stream to a user based on information obtained from a third-party website. The video stream interface can further support interaction between the user and the video stream, where the interaction can include selecting objects such as products that appear within the video stream. The video stream interface is based on third-party webpage information. Information is obtained on one or more products from a website by a third party. A video about the one or more products is rendered by a video user interface to a user. The video user interface and the third party are interfaced between each other based on a user interaction with the video user interface. Product information is fetched from a server based on the interfacing between the video user interface and the third party. The video is augmented with further information based on the fetching.

The system block diagram 300 can include a device 310. The device can include a computing device such as a desktop computer or laptop computer; a personal electronic device such as a smartphone, PDA, or tablet; a video player device; and so on. The device can be used by a user to access content such as web content, where the web content can include text, video files, audio files, and the like. A video user interface 312 can be associated with the device. The video user interface can include a display component with which a user can view content such as video content. The video user interface can further include an interaction component. The interaction component can be used to determine interactions between a user of the interface and contents rendered in the video user interface. The video user interface can be based on an app such as a video player app. The video user interface can display content within a window or frame associated with the video user interface. Various types of content can be displayed using the video user interface. In embodiments, the content can include website content 314. The website content can be obtained from a website (discussed shortly). The website content can include a video in which one or more products are included. The video user interface can further include a rendering component. The rendering component can be used to render a video 316 about the one or more products. The video 316 can be displayed in a frame. The user can interact with the products within the video. The interacting can be used to fetch further information about the one or more products.

The system block diagram 300 can include a third-party website 320. The third-party website can present of wide range of information such as political messages, educational materials, public service announcements, travel services, etc. The information can include videos such as livestream videos, video streams, short-form videos, and so on. The information can further include text and audio files, links to other webpages and websites, etc. The information can be rendered in a window or frame associated with the video user interface such as the website content 314 frame discussed above. The website information can include product information 322 for one or more products. The product information can include one or more products that can be seen in the content of the third-party website. The system block diagram 300 can include a rendering engine 330. The rendering engine can be used to render information about the one or more products. The product information can include one or more videos associated with the one or more products. The rendering to a user can be accomplished by the video user interface within a window, a frame, and so on, such as video 316 frame.

The user can interact with the video user interface. The interacting can include common actions, gestures, and so on, utilized by a user as they interact with a device such as a personal electronic device. In embodiments, the user interaction can be accomplished by mousing over an object in the video. The mousing can in turn be accomplished by moving a cursor with a mouse device, sliding a digit over a trackpad, and the like. In other embodiments, the user interaction can be accomplished by clicking on an object in the video. The clicking can include clicking a button on a mouse device, tapping a trackpad, etc. In further embodiments, the interfacing can include a request for further information on an object, based on the user interaction. An object can include a product or service, an item used by a person present in the website content, an item presented by the person, and the like. The further information can describe the object, present pricing information associated with the object, etc. The interacting can be used by an interfacing engine 340. The interfacing engine can interface between the video user interface and the third party with which the third-party website is associated. The interfacing engine can detect user interactions with the video user interface, the type of interaction, and so on. The interactions can include tapping, clicking, or selecting objects rendered in the video user interface as described above. The interactions can also include selecting an object using a "shop" icon rendered within the video user interface. The shop icon can be rendered as a shopping bag, a shopping cart, and so on. The selecting an object, adding an object using a shop icon, etc., can include a request for information such as product information associated with the object. The request for information about a product can be accomplished by a server 350. The server can fetch the product information 322 associated with the third-party website 320. The server can provide the fetching information to the interfacing engine. In embodiments, further information based on the fetching can be used to augment the video. The augmenting can be accomplished by the rendering engine 330.

Figure 4:
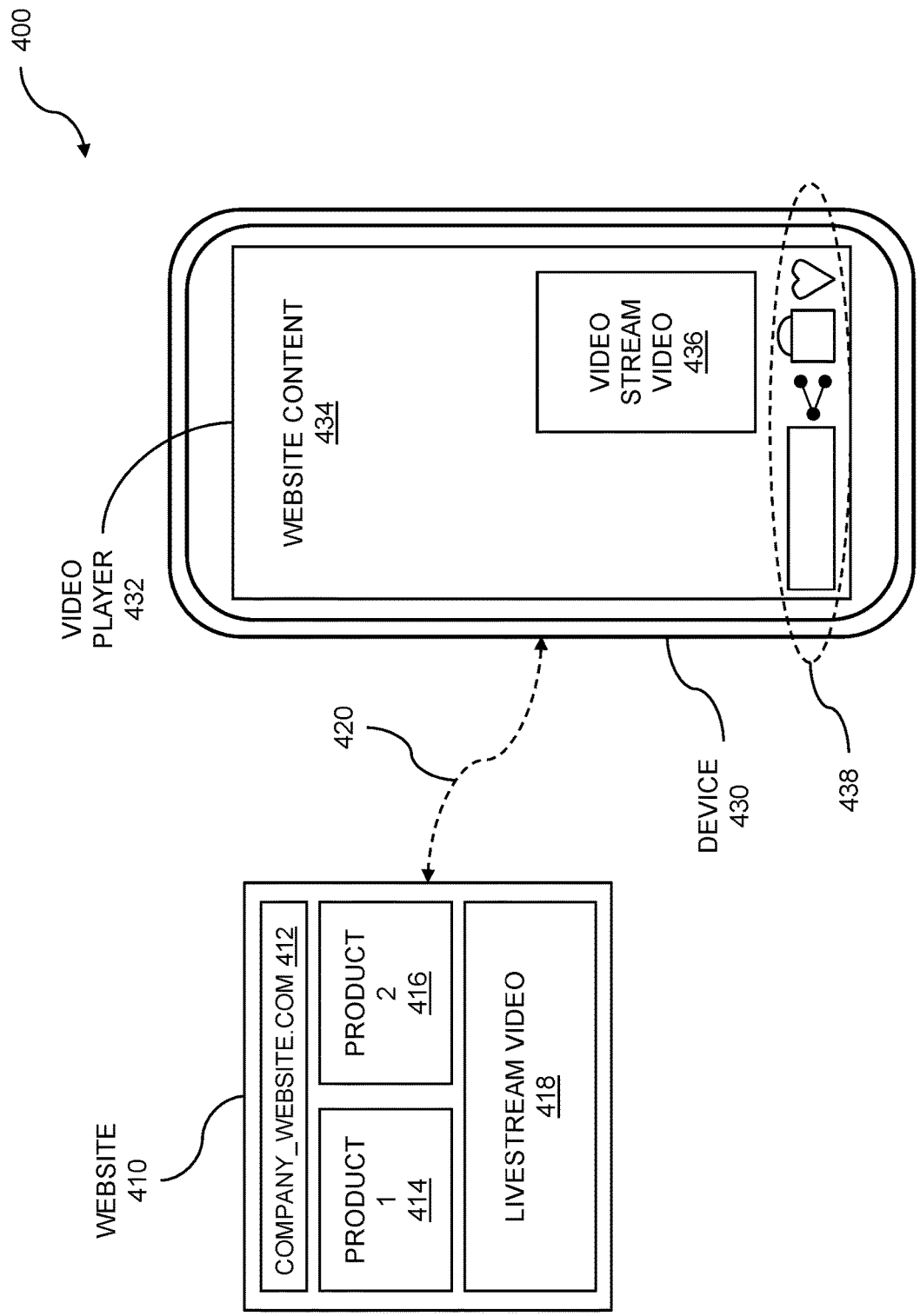
FIG. 4 illustrates webpage information and a video stream on a device.

FIG. 4 illustrates webpage information and a video stream on a device. A user can view a video, where the video can include a livestream video, a video stream, a short-form video, and so on. The video can include products, services, and so on, that can be promoted by a provider of the videos. The livestream videos and other videos, which can include videos presented by celebrities, tastemakers, influencers, and so on, can mention, promote, endorse, highlight, or otherwise present one or more products. The products can be available for purchase on a web site. A user can learn more about the products, purchase the products, etc., by clicking on the products within a video. Rendering of the webpage and video stream on a device such as a personal electronic device is enabled by a video stream interface based on third-party webpage information. Information is obtained on one or more products from a website by a third party. A video about the one or more products is rendered by a video user interface. The rendering is provided to a user. Interfacing between the video user interface and the third party is provided based on a user interaction with the video user interface. Product information is fetched from a server based on the interfacing between the video user interface and the third party. The video is augmented with further information based on the fetching.

Webpage information and a video stream rendered on a device are illustrated 400. The webpage can be associated with a website 410, which can include text, one or more videos, one or more audio files, and so on. The website is accessible by providing a universal resource locator (URL) address 412. To access the website, one enters the URL into a web browser such as Chrome™, Edge™, Firefox™, Opera™, Safari™, etc. The contents of the webpage can include information associated with one or more products such as product 1 414, product 2 416, and so on. While two products are shown, other numbers of products can be included on the webpage, webpages accessible through the webpage, etc. The contents of the webpage can further include livestream video 418. The livestream video can demonstrate the one or more products, can endorse products, can instruct users in the use of the products, and so on.

The contents of the one or more webpages associated with the website 410 can be provided to a device 430 via a connection 420 such as a network connection. The connection 420 can include a wireless connection such as a Wi-Fi™, Bluetooth™, or cellular connection; a wired connection such as an Ethernet™ connection; and so on. An app such as a video player app 432 can be executed on the device in order to display website content 434. In embodiments, the website content can be rendered to a user by a video user interface. The video user interface can be used to display a video about one or more products associated with the website 410. The video player can also be used to render a video stream video 436. The video stream video can include a livestream video, a video stream, a short-form video, and so on. The video stream video can include information about one or more products associated with the website. The one or more products within the video stream video can be selectable by the user in order to obtain further information about the one or more products. Icons 438 associated with the website can also be rendered by the video player. The icons can include one or more icons such as online vending, social media, and so on. In embodiments, the icons can include a chat box, a sharing icon, a shop icon such as a bag or cart, a "like" icon, etc. The icons can be used to purchase one or more products, discuss the products, provide links to other or similar products, and so on.

Figure 5:
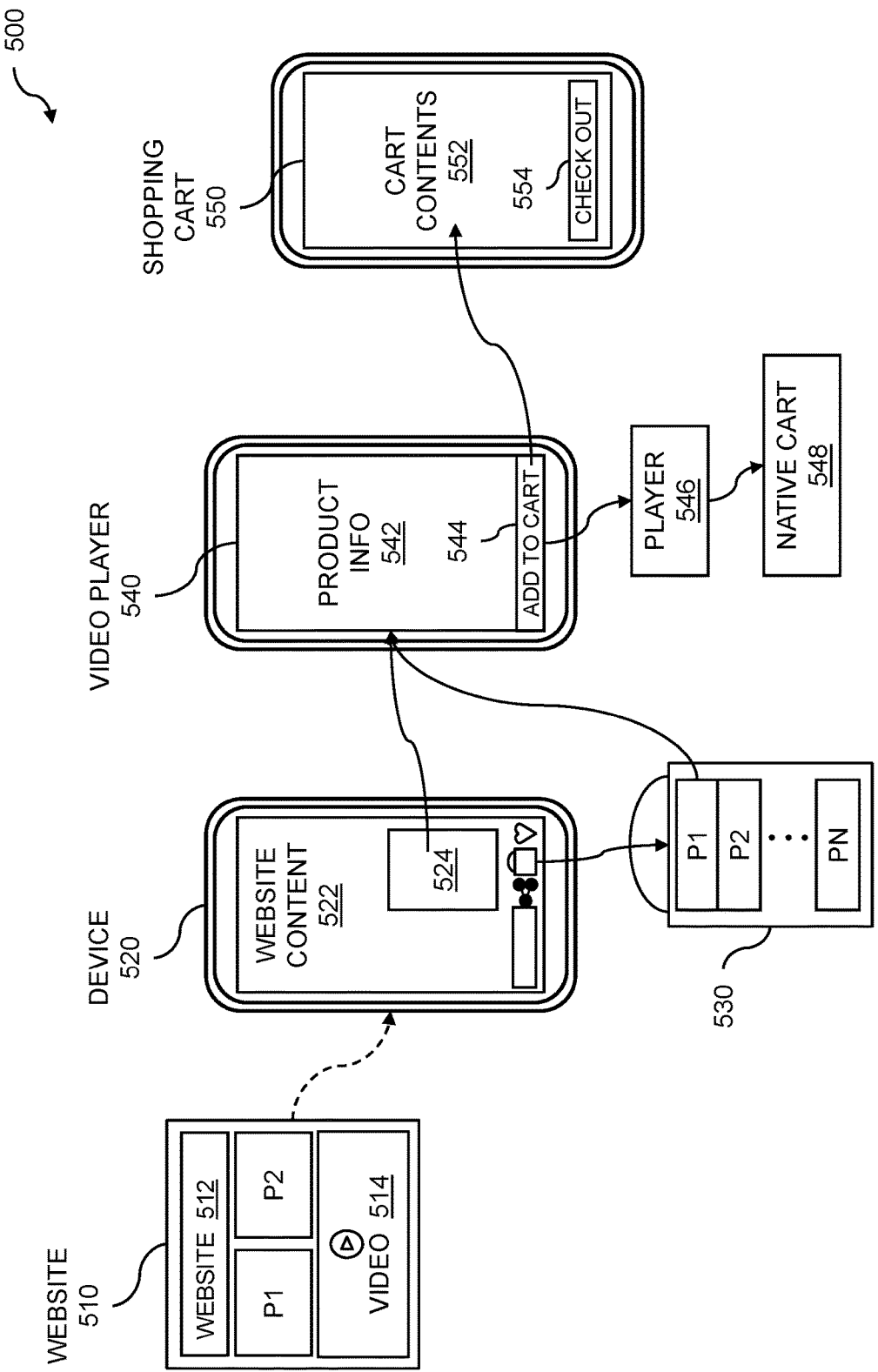
FIG. 5 is an infographic diagram for an add-to-cart operation.

FIG. 5 is an infographic diagram for an add-to-cart operation 500. A user can view a video in which a product is introduced, promoted, endorsed, and so on. The user can choose to learn more about the product and if interested, can add the product to a shopping bag or cart in order to purchase the product. The user can learn about the product, can purchase the product, etc., without leaving the video that contains the product. Instead, the video can continue to play while the user is learning more about the product, purchasing the product etc. The add-to-cart operation can be accomplished by clicking on a shop icon or by interacting with the product within the video. The interacting can include tapping, clicking, swiping, and the like. The add-to-cart operation is enabled by a video stream interface based on third-party webpage information. Information on products is obtained from a website by a third party. A video about the products is rendered to the user by a video user interface. The video user interface and the third party are interfaced between each other based on a user interaction with the video user interface. The video is augmented with further information based on the fetching.

A website 510 can include information associated with one or more products. The website can be accessible using a uniform resource locator (URL) or "web address" 512. The URL can be input to a web browser to access the website. The website can include text, videos, audio files, and other content. The website can include product information associated with one or more products such as product P1 and product P2. The website can include video content such as video 514. The video can include livestream video, a video stream, a short-form video, and the like. A device 520 can be used to display website content 522. The device can include a hand-held electronic device, a portable electronic device, a desktop electronic device, and so on. In addition to the website content, a video 524 can be rendered. The video can include product information and other information. The user who is viewing the website content and the video can choose to learn more about one or more products. The user can learn more about the products by interacting with a shop icon such as a bag or cart icon, by tapping on a product presented in the video 524, etc. Interacting with the shop icon can add the product to a shopping bag 530, a shopping cart, and so on. The shopping bag or cart can include one or more products such as product P1, product P2, product PN and so on. The user can select a product such as product P1 to obtain information associated with the product.

A video player 540 can be used to render product information 542 for a product selected within the video 524 or added to the bag 530. The product information can present details associated with the product such as size, color, price, availability, shipping and other costs, configuration information, and so on. A user can choose to select the product for purchase by interacting with a shop icon such as an "Add To Cart" icon 544. Interaction with the shop icon can be detected by the video player 546. The video player can configure the shop information into a suitable format, and can provide the formatted shop information to a native cart 548 associated with the website 510. Further, interaction by the user with the shop icon can enable display of a shopping cart 550 on the device 520 with which the user is interacting. Cart contents 552 can include one or more products that the user wishes to purchase. When the user is ready to purchase, the user can indicate this by tapping, clicking, etc. on an icon such as a "Check Out" icon 554. The user can then be directed to a payment site, where the payment site can be associated with the website 510.

Figure 6:
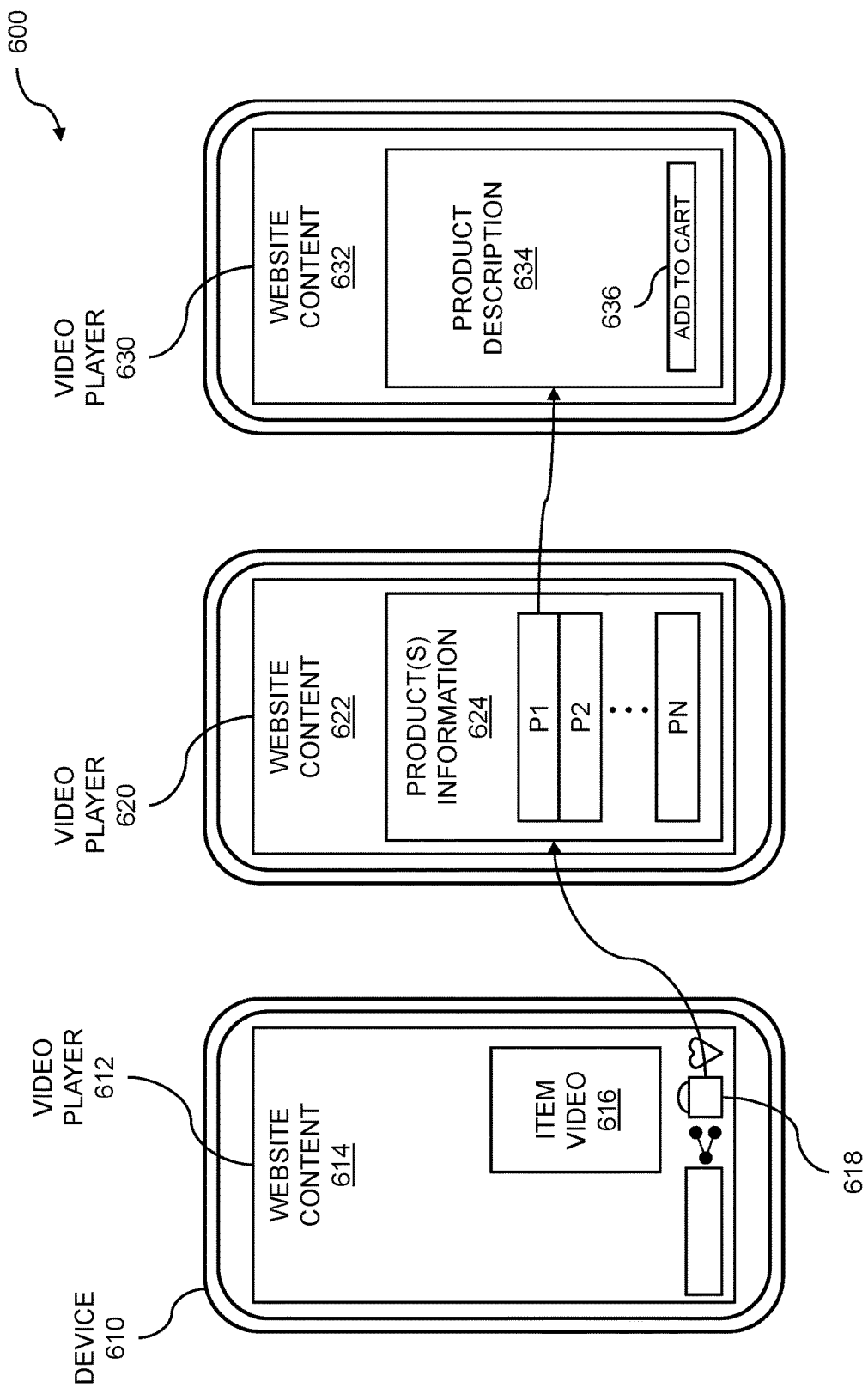
FIG. 6 illustrates providing product information via a shop icon.

FIG. 6 illustrates providing product information via a shop icon. A user can be viewing a video, where the video can include a livestream video, a video stream, a short-form video, and so on. The user may be interested in a product presented within the video and may wish to purchase the product. By tapping the "shop" icon, such as a shopping bag, a shopping cart, and so on, the user can be presented with information associated with the product of interest. The information is obtained using a video stream interface based on third-party webpage information. Information is obtained on one or more products from a website by a third party. A video about the one or more products is rendered to the user by a video user interface. The video user interface and the third party are interfaced between each other based on a user interaction with the video user interface. Product information is fetched from a server based on the interfacing between the video user interface and the third party. The video is augmented with further information based on the fetching.

Providing product information via a shop icon to a user is illustrated 600. A device 610 associated with a user can provide product information to the user using a video player 612. The device can include a personal electronic device, a computer, and so on. The video player can include a video stream player or other video player. Website content 614 obtained from a web site associated with a third party can be provided to a user associated with the device. The website content can include text, video, audio, etc. An item video 616 can also be presented to the user. The item video can include video associated with a product that can be included within the website content. In addition to the website content, a "shop" icon 618 can be included. The shop icon can be represented by a bag, a cart, and so on. A user who wants to learn more about a product seen in the website content can click, tap, or otherwise interact with the shop icon.

The video player 620 can continue to play a video associated with the website content 622. User interaction with the shop icon 618 can cause a window, a frame, etc., to open over the website content. The window, frame, and the like can include product information 624 associated with one or more products shown within the website content. The one or more products can include products such as product P1, product P2, product PN, and so on. The user can interact with a product rendered within the product information frame by tapping, clicking, swiping, etc. The video player 630 can continue to play the video associated with the website content 632. A product description 634 can be displayed within a window, a frame, and the like. The product description can include detailed information such as size, color, availability, etc. If interested in the product, the user can tap, click, etc., an "Add To Cart" icon 636. If the user instead wants to obtain a product description associated with a different product, the different product can be selected. The product description 634 can be updated to present the description associated with the different product.

When the user locates the product in which she or he is interested, they can select the "Add To Cart" icon.

Figure 7:
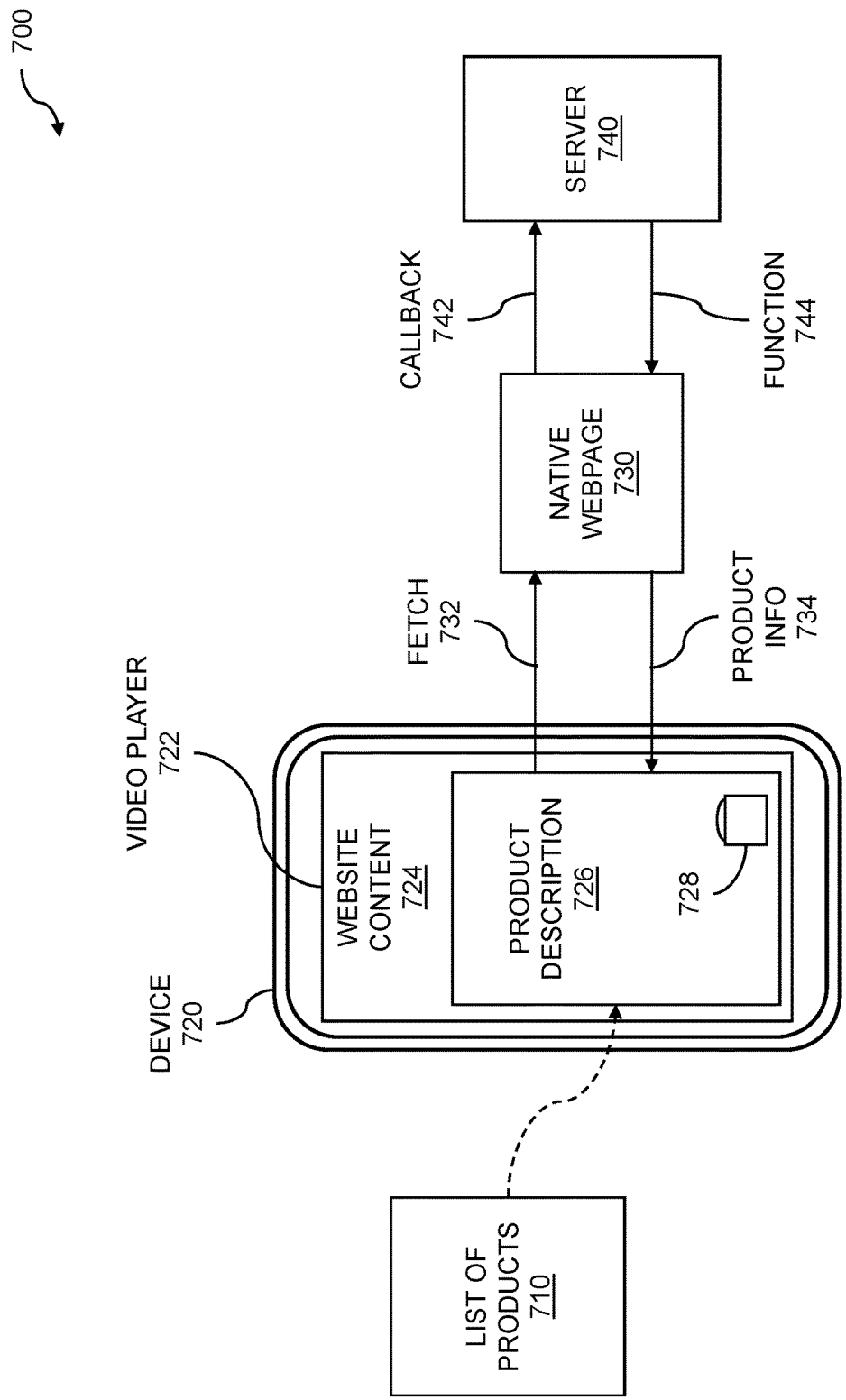
FIG. 7 shows product hydration.

FIG. 7 shows product hydration. Product "hydration" can include obtaining information about a product from a third-party webpage. The product information can include product options such as size and color, product availability, product cost, shipping and handling charges, and so on. The product information can be obtained from a native webpage associated with a third-party website. The product information can be presented on a device associated with a user by rendering the product information in a video player. The user can then interact with the product information rendered in the video player. Product hydration is enabled by a video stream interface based on third-party webpage information. Information on one or more products from a website by a third party is obtained. A video user interface is used to render a video about the one or more products to a user. An interface is established between the video user interface and the third party based on a user interaction with the video user interface. Product information is fetched from a server based on the interfacing between the video user interface and the third party. The video is augmented with further information based on the fetching.

Product hydration is shown 700. A list of products 710 can be rendered on a device 720 using a video player 722. The list of products can include one or more products presented, discussed, etc. within a video. The device can include a smartphone, PDA, tablet, laptop computer, desktop computer, and so on. The video player can include a video app, a video plug-in associated with a web browser, a purpose-built video app, and the like. A product description 726 can be presented. The product description can be associated with one or more products. The presenting of the product description can be accomplished within a frame of website content 724. The user can interact with the product information. Interacting with the product information can include adding the product to a shopping bag 728, a shopping cart, and so on, using a shop icon. The product information can be obtained or "scrubbed" from a native webpage 730 associated with the product. A request or fetch 732 can be issued from the device based on a user interaction with a product within the product description. Product information 734 can be provided to the video player and rendered for the user. The native webpage is enabled by a server 740. A callback 742, a request for information, and so on can be sent to the server. The server can execute the information request based on a function. The function 744 can return results via the native webpage to the video player. In a usage example, a user can see a product in which she or he is interested. The user can place the product into a shopping cart by tapping the shopping cart or shopping bag icon rendered by the video player. In contrast to performing purchasing tasks within the video player on the device, the purchase request is provided to the third-party webpage through the user interface. Thus, the purchase can be executed by the native webpage.

Figure 8:
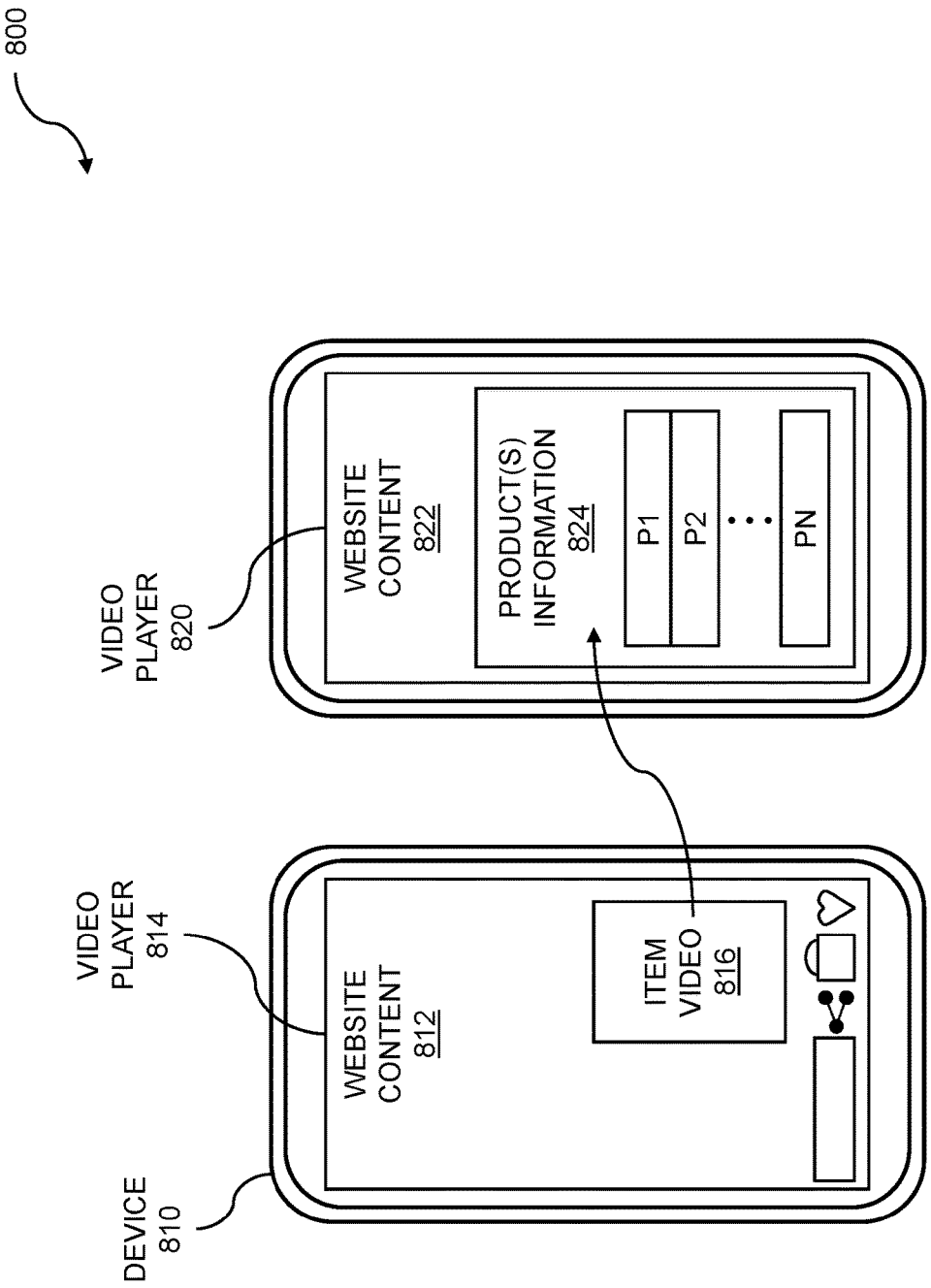
FIG. 8 illustrates delivering product information via a video stream.

FIG. 8 illustrates delivering product information via a video stream. A user can view a video stream in which one or more of a variety of products can be displayed. The products can be associated with information scrubbed from a third-party webpage. The user may be interested in obtaining further information related to one or more of the products. By interacting with a video user interface, the user can indicate a product of interest and can be presented with information associated with the product of interest. The interacting with the user interface can be based on familiar interactions such as moving a cursor, tapping, clicking, and so on. A video stream interface based on third-party webpage information enables delivery of product information via a video stream. Information on one or more products is obtained from a website by a third party. A video about the one or more products is rendered by a video user interface to a user. The video user interface and the third party are interfaced between each other based on a user interaction with the video user interface. Product information is fetched from a server based on the interfacing between the video user interface and the third party. The video is augmented with further information based on the fetching.

An example illustrating delivery of product information via video stream is illustrated 800. The video stream can be rendered on a device 810. The device can include a handheld device such as a smartphone, PDA, or tablet; a portable device such as a laptop computer; a desktop computer; and so on. The product information, which can be obtained or "scrubbed" by accessing website content 812 from a third-party website, can be delivered as video to the device using a video player 814. The video can include a livestream video, a video stream, a short-form video, and so on. The video can include a product presentation, a tastemaker or influencer talking about their favorite product, and so on. An item video 816 can include video about the favorite product. In a usage example, an influencer can be discussing her or his favorite product such as a smartphone case. While they are doing that, the item video can present information about the smartphone case. The information can include different sizes for different smartphone models, color selections available, additional features such as card carriers or charging interfaces, and the like. A user viewing the product presentation can swipe, tap, click, or otherwise interact with the item video to indicate that further information about the item within the video is desired. Interacting with the item video can cause a window, frame, or the like to open over the website content to present the requested information. The video player 820 can continue to present the website content 822 just described. A frame 824, window, etc. can open over a portion of the website content. A plurality of products such as products P1, P2, and PN can be presented within the frame. The user can scroll through the products, make a selection, and so on. In embodiments, the user can interact with the third-party website that offers the products simply by interacting with the products within the product information frame. Interacting can include obtaining further information, placing a product in a shopping cart associated with the third-party website, saving the product for later, purchasing the product, and the like.

Figure 9:
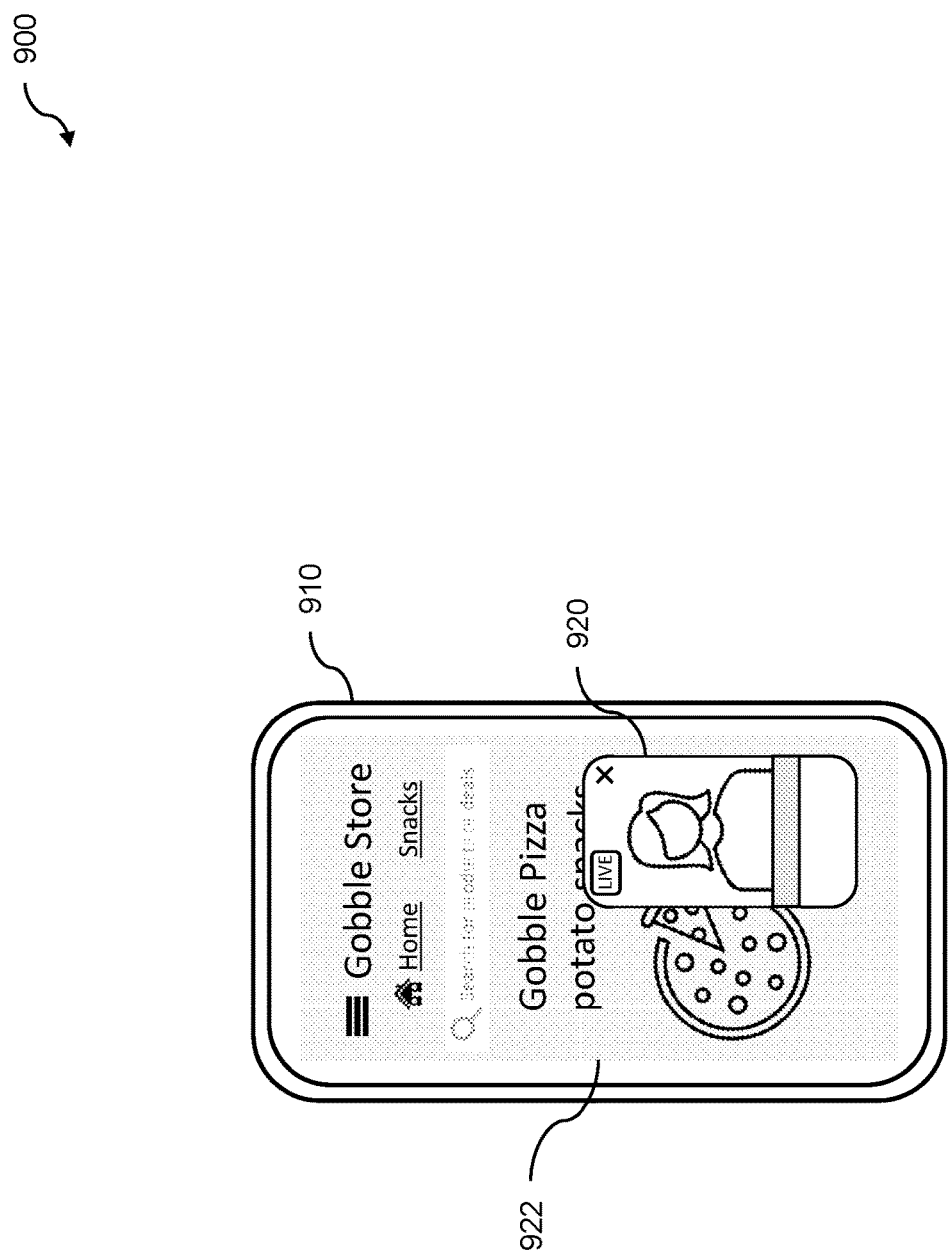
FIG. 9 is an example that shows a reduced video in a child frame, along with webpage information.

FIG. 9 is an example that shows a reduced video in a child frame, along with webpage information. The webpage information can be included within a child frame. A user can experience a video stream by viewing the stream on an electronic device such as a computer or personal electronic device. The video stream can be viewed using an app such as a video app, a window associated with a web browser, and so on. The individual who is experiencing a video stream video can click website information associated with the video stream. The website information can include product information. The video can be rendered, along with the information scrubbed from a third-party website. The video can be reduced to render the reduced video in a frame on a portion of the device display. The results of the link can be rendered within a child frame on the device display. The results of the link can include a webpage. Video and webpage rendering are enabled using a frame and a child frame. The frame and the child frame enable a video stream interface.

An example of a reduced video and website content is shown 900. The reduced video and the website content can be rendered on a display 910, where the rendering can be accomplished using an app, a browser window, and so on. In embodiments, the rendering is accomplished using a video stream interface. The video stream video can be reduced so that the video can be rendered in a portion of the app or browser window along with results of the selected link. The video 920 can be rendered within a frame. The frame can enable viewing of the video stream video; pausing, playing, and stopping the video; and the like. In embodiments, the reducing the video to render the video in a portion of the app or browser window can include launching a third-party webpage 922 to render the video superimposed over the third-party webpage. The website content can be rendered in a child frame. The reduced window can be rendered at various locations within the app or browser window. In embodiments, the reducing can cause the video to render in a lower right corner of the app or browser window. The location of the reduced video can be fixed, predefined, user defined, and so on. Embodiments can include modifying location for the rendering. The modifying can include clicking on a grid, choosing a menu option, and the like. In embodiments, the modifying location can be implemented in response to a mouse or trackpad dragging motion by the user.

Figure 10:
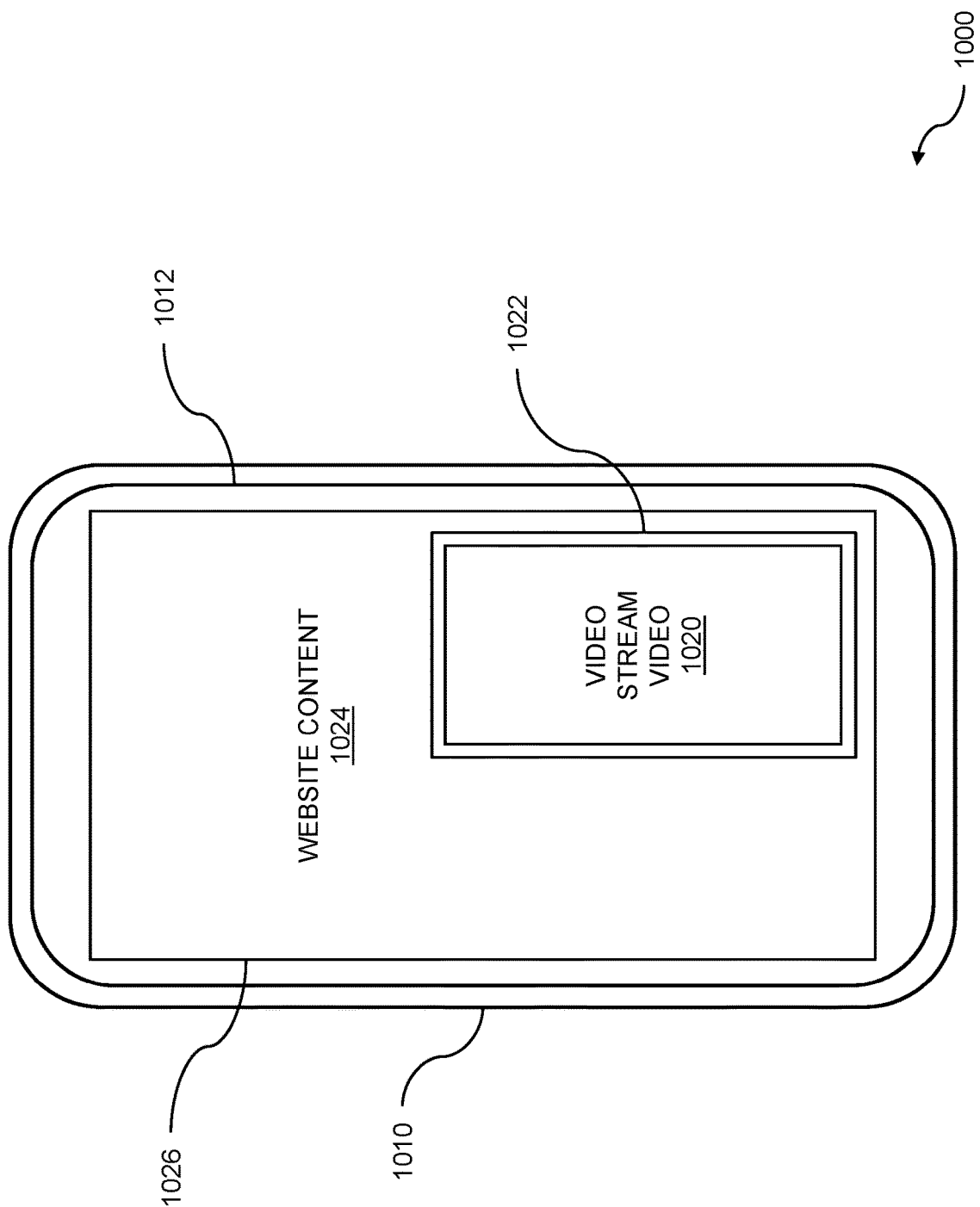
FIG. 10 illustrates a representation of a video stream video and website content.

FIG. 10 illustrates a representation of a video stream video and website content. Video stream video and website content obtained for an individual can be rendered within a frame and one or more child frames. The frame and a child frame can be used for video and webpage rendering, where the webpage can include product information. Information on one or more products is obtained from a website by a third party. A video about the one or more products is rendered by a video user interface to a user. The video user interface and the third party are interfaced between each other based on a user interaction with the video user interface. Product information is fetched from a server based on the interfacing between the video user interface and the third party. The video is augmented with further information based on the fetching. An example video stream video and third-party webpage information are shown 1000. The video, and the webpage information which can include product information, can be rendered within an application or app, a window associated with a web browser, and the like. An app or a web browser can be executed on an electronic device 1010. The rendering can be accomplished on a display 1012 associated with the electronic device. The electronic device can include a computer, a laptop computer, a smartphone, a tablet, a PDA, and so on. The rendering of a video stream video 1020 can be accomplished using a frame 1022. The frame can occupy a portion of the display. The frame can include a frame within an app, a frame within a browser window, etc. In embodiments, the rendering the reduced video and webpage content is accomplished without a popup window. The webpage content 1024 can be rendered within a child frame 1026. In a usage example, the webpage content can include one or more of a product, a service, a coupon, or a membership. Embodiments include launching a child frame into which the webpage is displayed. The child frame 1026 can be larger than the parent frame 1022. In embodiments, the child frame surrounds the video being rendered.

The location of the reduced video 1020 within the frame 1022 can include a corner, the center, and so on. The results from the link, such as a third-party webpage, can be scrolled to enable viewing of content of the third-party webpage. In embodiments, the reducing the video to render the video in a portion of the window along with the third-party webpage can result in the video being rendered such that it remains fixed in the browser window while the third-party webpage is scrolled. The reduced video can play while the third-party website is scrolled. Content presented on the third-party website can be selected for viewing, watching, listening, reading, and so on. In embodiments, the rendering the video can accomplish a picture-within-picture function. The reduced video can be accompanied with one or more options to select further content. The further content can include videos, images, text, audio, and so on. The further content can comprise a webpage. The further content can be rendered. In embodiments, the rendering the video can accomplish a page-within-page function.

Figure 11:
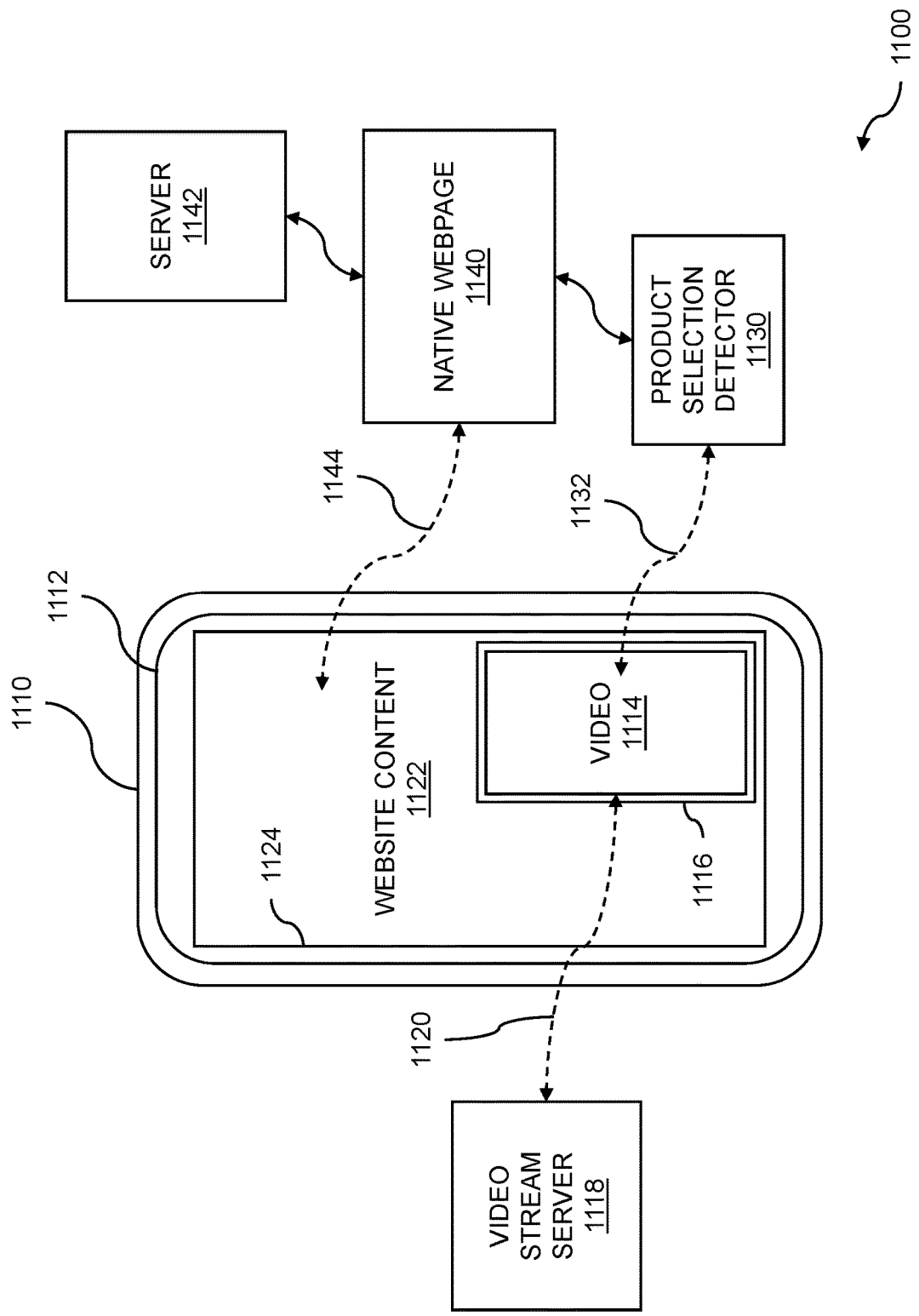
FIG. 11 is a system block diagram for video and webpage rendering.

FIG. 11 is a system block diagram 1100 for video and webpage rendering. A video such as a livestream video, video stream, or short-form video, and contents of a website such as a third-party website, can be rendered on a display associated with a computer, a personal electronic device, and so on. The rendering can be based on the use of a frame and one or more child frames for displaying the video and the results of the link. A video stream interface based on third-party webpage information is enabled by the frame and the child frame. Information on one or more products is obtained from a website by a third party. A video about the one or more products is rendered by a video user interface to a user. The video user interface and the third party are interfaced between each other based in part on a user interaction with the video user interface. Product information is fetched from a server based on the interfacing between the video user interface and the third party. The video is augmented with further information based on the fetching.

Described throughout, videos associated with video streams can be viewed by a user who is interested in the contents of the stream, curious about the stream, an avid follower of an individual associated with the stream, and so on. The stream associated with the video stream can be obtained from a server or a social media site, can be provided by an individual, etc. An individual viewing the video associated with the video stream can make a selection of a product within the video stream content that can be of interest to the individual. The selection of the content, such as a product, can be indicated by clicking on an object presented along with the video stream, a link to an item shared by another viewer in a chat stream, a link embedded in the video stream, and the like. The content can be associated with a webpage, a product displayed on the website, a PDF, audio or image information scrubbed from the website, etc. A webpage by a third party can include one of a plurality of webpages that can be viewed by the individual. Webpage content can be rendered along with a reduced version of a video. The individual can interact with the webpage while the video stream continues to play. The rendering of webpage content and the reduced video can be viewed on an electronic device 1110. The electronic device can include a desktop or laptop computer, a tablet or smartphone, a personal digital assistant (PDA), and so on. The electronic device is coupled to a display 1112 on which a video such as a reduced video associated with a video stream 1114 can be rendered. The video stream can be rendered within a frame 1116. The frame can be used to display content such as the video stream, and can be independent of the app, browser window, etc., that can contain the frame.

The video stream can be received from a video stream server 1118. The video stream server can include a web-based or cloud-based server, a local server, an electronic device associated with the provider of the video stream, etc. The video stream server can provide the video stream using a communication channel 1120. The communication channel can include a wired channel, a wireless channel, and the like. Described below, an individual can click on a product associated with the video stream. Website content 1122, which can include product information, additional information, etc., can be rendered within a frame 1124, where the frame 1124 can include a child frame. Embodiments include launching a child frame into which a webpage or other content is displayed. Note that in the system block diagram 1100, the frame within which the website content can be rendered surrounds the reduced video that is being rendered. In embodiments, the rendering the reduced video can accomplish a picture-within-picture function. The website content, rendered within the child frame 1124, can include a video, audio, text, etc. In other embodiments, the rendering can be accomplished using an inline frame function within an internet browser (web browser) application. The individual can view the video while she or he interacts with the content within the child frame. The interacting can include swiping, scrolling, or clicking links, radio buttons, menu selections, etc.

The system block diagram 1100 can include a product selection detector 1130. The product selection detector can detect that an individual has selected a product, where the product can include a product available on the third-party website, a product described by the provider or originator of the video stream, a product referenced in a chat associated with the video stream, a link embedded within the video stream, etc. The product can be selected by clicking on a displayed product, swiping, selecting a link from a menu, etc. The product selection can be received by the product selection detector using a communication channel such as a wireless communication channel 1132. The product selection detector can provide the product selection information to a native webpage 1140. The native webpage can include the webpage provided by the third party. The product selection detector server can provide access to product information by accessing a server 1142 that hosts the webpage. The providing can be accomplished by passing a callback function to the third party. The callback function can enable access to one or more functions associated with the webpage such as access to a shopping cart associated with the webpage. Access to the shopping cart can enable a user to collect objects of interest, such as products, services, and the like. The access to the third-party website shopping cart can enable the user to purchase products, services, etc., without having to exit from the rendering in order to navigate to the webpage. The third-party website server can provide the website content 1122 to the child frame using a communication channel. In embodiments, the communication channel can include a wireless 1144 communication channel.

Figure 12:
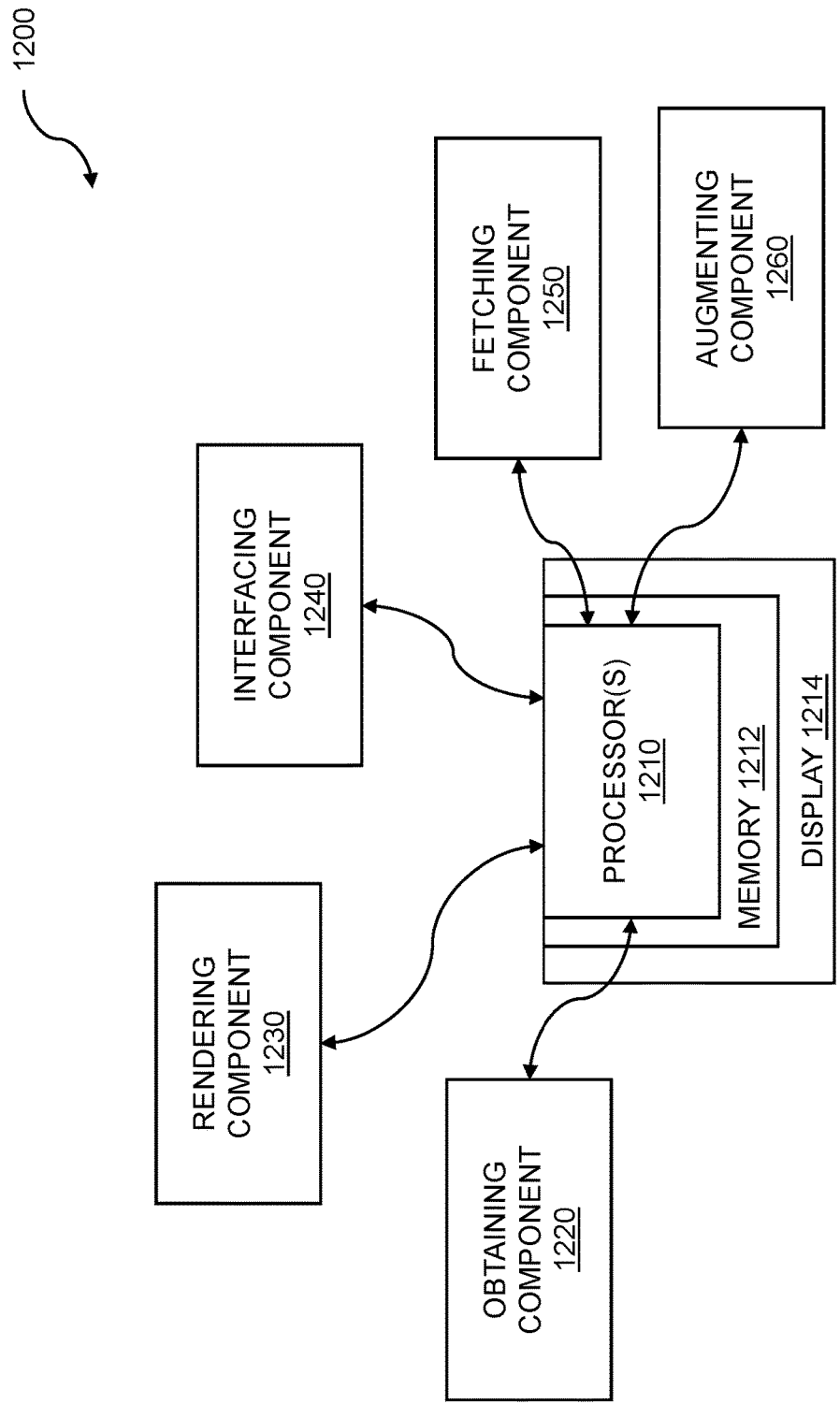
FIG. 12 is a system diagram for display.

FIG. 12 is a system diagram for display. Display is enabled by a video stream interface based on third-party webpage information. The system 1200 can include one or more processors 1210 attached to a memory 1212 which stores instructions. The system 1200 can include a display 1214 coupled to the one or more processors 1210 for displaying data, video streams, videos, webpages, intermediate steps, instructions, and so on. In embodiments, one or more processors 1210 are attached to the memory 1212 where the one or more processors, when executing the instructions which are stored, are configured to: obtain information on one or more products from a website by a third party; render, by a video user interface, to a user, a video about the one or more products; interface between the video user interface and the third party based on a user interaction with the video user interface; fetch product information from a server based on the interfacing between the video user interface and the third party; and augment the video with further information based on the fetching.

The system 1200 can include an obtaining component 1220. The obtaining component 1220 can include functions and instructions for obtaining information on one or more products from a website by a third party. The information can include a variety of data types including text, video, audio, and the like. The information can include promotional information such as coupons, promotions, "buy within 5 minutes and save" offers, etc. The products can include products presented on a website by a third party, offered for sale, promoted, and the like. In embodiments, the one or more products can include a product, a service, a coupon, or a membership. The system 1200 can include a rendering component 1230. The rendering component 1230 can include functions and instructions for rendering, by a video user interface, to a user, a video about the one or more products. The user interface can include a web browser, a video player app, a specialty app provided by a vendor or service, etc. The video that is rendered by the user interface can include a variety of video types. In embodiments, the video can include a livestream video. The livestream video can be presented by an enterprise, a celebrity, a promoter, etc. A live video stream, where the originator of the video stream can include a tastemaker, an influencer, an artist, a musician, a DJ, an individual with content she or he wants to share, a provider of a good or service, and so on. The video stream can include content such as news, sports, advertisements, political events, culture, popular news such as celebrity updates, real-time cute puppy and kitten videos, nature news, and so on. In other embodiments, the video can include a video stream. The video stream can include a curated stream; videos from a streaming website, a video server, social media or other shared sites; and the like. The video stream can include a recorded message, a previously recorded livestream, etc. In further embodiments, the video can include one or more short-form videos. A short-form video can include a video that displays for 30 seconds, 2.5 minutes, fewer than 10 minutes, and the like. In embodiments, the rendering the video along with a webpage from the website is accomplished without a popup window. By forgoing use of one or more popup windows, video and webpage content can be rendered without a user having to change popup window blocking settings. Embodiments further include launching a child frame into which the webpage is displayed. The child frame can be associated with browser tab or window. In embodiments, the rendering can be accomplished using an inline frame function within an internet browser application.

The system 1200 can include an interfacing component 1240. The interfacing component 1240 can include functions and instructions for interfacing between the video user interface and the third party based on a user interaction with the video user interface. The user interaction can be determined based on a range of interaction detection techniques. In embodiments, the user interaction can be accomplished by mousing over an object in the video. The mousing can include moving a cursor using a mouse, a trackpad, a touchscreen, and the like. In other embodiments, the user interaction can be accomplished by clicking on an object in the video. The clicking can include clicking a mouse button, tapping a trackpad, touching a touchscreen, etc. The interfacing can include using techniques for harvesting information presented on the third-party website, accessing services on the third-party website, and so on. Further embodiments can include launching the video based on a selection by the user of a link on the website. In other embodiments, the interfacing can include passing a callback function from the video user interface to the third party based on the user interaction. A callback function, such as a callback function in JavaScript™, can be passed as an argument to another function. The callback function can be used to accomplish a variety of operations associated with the third-party website such as using a shopping cart. In embodiments, the callback function can include a list of objects being rendered in the video. The objects rendered in the video can include items for purchase, services offered, etc. Recall that the third-party website can be scrolled, including scrolling through a display, list, etc. of objects within the video. Items on the third-party website can come into view and can go out of view. In embodiments, the callback function can be updated when an object disappears from view on the video, appears in view, and the like. In other embodiments, the interfacing can include a purchase selection for an object. The interfacing can enable a user to purchase an object through the video stream rather than having to switch applications from a video display app to a web browser or specialty app.

The system 1200 can include a fetching component 1250. The fetching component 1250 can include functions and instructions for fetching product information from a server based on the interfacing between the video user interface and the third party. Discussed above, the information that is fetched can include product information, product availability, product inventory levels, etc. In embodiments, the interfacing can include a request for further information on an object based on the user interaction. The further information can include information associated with new product releases, backorder status, repair service status, and the like. In embodiments, the further information associated with the one or more products can include a reaction, a chat, a transaction, a promotion, an interaction, etc. The further information can be obtained from the third-party website, from social media websites, from product review websites, and the like. In embodiments, the obtaining information and further information can be accomplished by scrubbing text from the third-party website.

The system 1200 can include an augmenting component 1260. The augmenting component 1260 can include functions and instructions for augmenting the video with further information based on the fetching. The augmenting can include displaying the further information, featuring the further information, and so on. The augmenting can include updating the callback function discussed above when an object appears in or disappears from view on the video. The augmenting based on the further information can be accomplished using various techniques including video rendering techniques for display. In embodiments, the displaying can highlight information on a webpage for an object, based on the user interaction. The highlighting can include rendering the text in a different color from other text on the website, presenting information in a child frame, etc. In further embodiments, the augmenting can include overlaying information over a portion of the video The system 1200 can include a computer program product embodied in a non-transitory computer readable medium for display, the computer program product comprising code which causes one or more processors to perform operations of: obtaining information on one or more products from a website by a third party; rendering, by a video user interface, to a user, a video about the one or more products; interfacing between the video user interface and the third party based on a user interaction with the video user interface; fetching product information from a server based on the interfacing between the video user interface and the third party; and augmenting the video with further information based on the fetching.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for display comprising:
   obtaining information on one or more products from a website by a third party;
   rendering, by a video user interface, to a user, a video about the one or more products;
   interfacing between the video user interface and the third party based on a user interaction with the video user interface, wherein the interfacing comprises passing a callback function, as an argument to a second function, from the video user interface to the third party based on the user interaction, and wherein the callback function is updated to augment information based on changes in product visibility as a result of a product from the one or more products disappearing from view on the video;
   fetching product information from a server based on the interfacing between the video user interface and the third party; and
   augmenting the video with further information based on the fetching, wherein the augmenting is based on the product visibility as a result of a product from the one or more products disappearing from view.

2. The method of claim 1 wherein the video user interface comprises a video player in combination with a user interface.

3. The method of claim 1 further comprising obtaining information associated with the one or more products.

4. The method of claim 1 wherein the obtaining information is accomplished by scrubbing text from the third-party website.

5. The method of claim 1 wherein the interfacing comprises a request for further information on an object based on the user interaction.

6. The method of claim 1 wherein the interfacing comprises a purchase selection for an object.

7. The method of claim 1 further comprising updating the callback function when an object disappears from view on the video and the augmenting updates to remove information on the object that disappears.

8. The method of claim 1 further comprising updating the callback function when an object appears in view on the video and the augmenting includes information on the object that appears in view.

9. The method of claim 1 further comprising launching the video based on a selection by the user of a link on the website.

10. The method of claim 1 further comprising rendering a webpage based on the user interaction.

11. The method of claim 10 further comprising synchronizing information on the webpage with additional information shown on the video.

12. The method of claim 11 wherein the synchronizing includes displaying e-commerce shopping cart information on the webpage and video shopping cart information shown on the video.

13. The method of claim 11 wherein the synchronizing includes removing information on an object when the object disappears from view on the video.

14. The method of claim 11 further comprising performing cart synchronization between an e-commerce shopping cart on the webpage and a cart representation displayed over a portion of the video.

15. The method of claim 11 wherein the synchronizing includes adding information on a new object in the webpage when the new object appears on the video.

16. The method of claim 1 further comprising determining a plurality of objects within the video.

17. The method of claim 16 further comprising displaying information on each of the plurality of objects within the video.

18. The method of claim 17 wherein the displaying includes displaying information as an overlay on the video.

19. The method of claim 17 wherein the displaying includes highlighting information on a webpage for an object, based on the user interaction.

20. The method of claim 16 wherein the augmenting includes overlaying information over a portion of the video.

21. The method of claim 1 wherein the rendering the video along with a webpage from the website is accomplished without a popup window.

22. A computer program product embodied in a non-transitory computer readable medium for display, the computer program product comprising code which causes one or more processors to perform operations of:
   obtaining information on one or more products from a website by a third party;
   rendering, by a video user interface, to a user, a video about the one or more products;
   interfacing between the video user interface and the third party based on a user interaction with the video user interface, wherein the interfacing comprises passing a callback function, as an argument to a second function, from the video user interface to the third party based on the user interaction, and wherein the callback function is updated to augment information based on changes in product visibility as a result of a product from the one or more products disappearing from view on the video;
   fetching product information from a server based on the interfacing between the video user interface and the third party; and
   augmenting the video with further information based on the fetching, wherein the augmenting is based on the product visibility as a result of a product from the one or more products disappearing from view.

23. A computer system for display comprising:
   a memory which stores instructions;
   one or more processors attached to the memory wherein the one or more processors, when executing the instructions which are stored, are configured to:
      obtain information on one or more products from a website by a third party;
      render, by a video user interface, to a user, a video about the one or more products;
      interface between the video user interface and the third party based on a user interaction with the video user interface, wherein the interfacing comprises passing a callback function, as an argument to a second function, from the video user interface to the third party based on the user interaction, and wherein the callback function is updated to augment information based on changes in product visibility as a result of a product from the one or more products disappearing from view on the video;
      fetch product information from a server based on the interfacing between the video user interface and the third party; and
      augment the video with further information based on the fetching, wherein augmenting is based on the product visibility as a result of a product from the one or more products disappearing from view.

24. The method of claim 1 wherein the video user interface enables product hydration.

25. The method of claim 24 wherein the product hydration includes obtaining product option information, wherein the product information includes product availability.

26. The method of claim 24 wherein the product hydration is enabled by a video stream interface based on third-party webpage information.

27. The method of claim 5 wherein the further information is displayed within a frame that is displayed over a portion of the website, wherein the further information enables scrolling through products and making a selection.

28. The method of claim 27 wherein the user interaction comprises a tap on the video.

29. The method of claim 6 further comprising executing a purchase based on the purchase selection, wherein the purchase is executed by the third-party website.

* * * * *